US011277628B2

(12) United States Patent
Pham Van et al.

(10) Patent No.: US 11,277,628 B2
(45) Date of Patent: Mar. 15, 2022

(54) RESTRICTIONS FOR THE WORST-CASE BANDWIDTH REDUCTION IN VIDEO CODING

(71) Applicant: QUALCOMM Incorporated, San Diego, CA (US)

(72) Inventors: Luong Pham Van, San Diego, CA (US); Wei-Jung Chien, San Diego, CA (US); Vadim Seregin, San Diego, CA (US); Han Huang, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 117 days.

(21) Appl. No.: 16/577,991

(22) Filed: Sep. 20, 2019

(65) Prior Publication Data

US 2020/0099945 A1 Mar. 26, 2020

Related U.S. Application Data

(60) Provisional application No. 62/737,604, filed on Sep. 27, 2018, provisional application No. 62/735,723, filed on Sep. 24, 2018.

(51) Int. Cl.
*H04N 19/423* (2014.01)
*H04N 19/513* (2014.01)
(Continued)

(52) U.S. Cl.
CPC ......... *H04N 19/423* (2014.11); *H04N 19/105* (2014.11); *H04N 19/132* (2014.11);
(Continued)

(58) Field of Classification Search
CPC ............................ H04N 19/105; H04N 19/433
See application file for complete search history.

(56) References Cited

U.S. PATENT DOCUMENTS

2014/0294078 A1* 10/2014 Seregin ................ H04N 19/577
375/240.15
2019/0089960 A1* 3/2019 Chen ...................... H04N 19/54
(Continued)

FOREIGN PATENT DOCUMENTS

WO 2019072210 A1 4/2019
WO WO-2019072210 A1 * 4/2019 ........... H04N 19/543

OTHER PUBLICATIONS

"Control-Point Representation and Differential Coding Affine-Motion Compensation"—Han Huang, John W. Woods, Yao Zhao, Huihui Bai; IEEE Transactions on Circuits and Systems for Video Technology, vol. 23, No. 10, Oct. 2013 (Year: 2013).*
(Continued)

*Primary Examiner* — Mainul Hasan
(74) *Attorney, Agent, or Firm* — Shumaker & Sieffert, P.A.

(57) ABSTRACT

An example method includes obtaining values of control point motion vectors (CPMVs) for a current block of video data selected for coding using affine mode; determining whether a memory bandwidth needed for accessing samples of a plurality of reference blocks derived based on the values of the CPMVs satisfies a bandwidth threshold; selectively modifying, based on whether the determined memory bandwidth satisfies the bandwidth threshold, a motion compensation method used to predict samples of the current block of video data; and predicting, using the selectively modified motion compensation method, the samples of the current block of video data from the samples of the plurality of reference blocks.

26 Claims, 12 Drawing Sheets

(51) Int. Cl.
H04N 19/132 (2014.01)
H04N 19/105 (2014.01)
H04N 19/137 (2014.01)
H04N 19/176 (2014.01)

(52) U.S. Cl.
CPC ......... *H04N 19/137* (2014.11); *H04N 19/176* (2014.11); *H04N 19/513* (2014.11)

(56) References Cited

U.S. PATENT DOCUMENTS

| | | | |
|---|---|---|---|
| 2019/0182503 A1 | 6/2019 | Tsai et al. | |
| 2019/0208211 A1 | 7/2019 | Zhang et al. | |
| 2019/0222865 A1 | 7/2019 | Zhang et al. | |
| 2019/0387242 A1* | 12/2019 | Toma | H04N 19/51 |
| 2020/0077115 A1* | 3/2020 | Li | H04N 19/521 |
| 2020/0213613 A1* | 7/2020 | Hashimoto | H04N 19/57 |
| 2021/0067798 A1* | 3/2021 | Chujoh | H04N 19/56 |
| 2021/0067799 A1* | 3/2021 | Hashimoto | H04N 19/57 |
| 2021/0185328 A1* | 6/2021 | Xu | H04N 19/184 |

OTHER PUBLICATIONS

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

Chen J., et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, 27 Pages, JVET-A1001.

Chen J., et al., "Further Improvements to HMKTA-1.0", 52. VCEG Meeting, Jun. 19, 2015-Jun. 26, 2015, Warsaw, (Video Coding Experts Group of ITU-T SG.16), No. VCEG-AZ07, Jun. 19, 2015 (Jun. 19, 2015), 8 Pages, XP030003885.

Chuang T-D., et al., "CE9.2.1: Bilateral Matching Merge Mode", 11th JVET Meeting; Jul. 11, 2018-Jul. 18, 2018; Ljubljana; (The Joint Video Exploration Team of ISO/IEC JTC1/SC29/WG11 and ITU-T SG.16 ), No. JVET-K0254, Jul. 10, 2018, XP030199311, Retrieved from the Internet: URL:http://phenix.int-evry.fr/jvet/doc_end-user/documents/11_Ljubljana/wg11/JVET-K0254-v2.zip JVET-K0254-v1.docx [retrieved on Jul. 10, 2018], 5 pages.

Ergen S., "ZigBee/IEEE 802.15.4 Summary", Sep. 10, 2004, 37 pp.

Huang H., et al., "CE2: Worst-Case Memory Bandwidth Reduction for Affine (Test 2-4.5)", Joint Video Experts Team (JVET) of ITU-T SG 16 WP 3 and ISO/IEC JTC 1/SC 29/WG 11, JVET-N0256, Mar. 19-27, 2019, 6 pages.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

International Search Report and Written Opinion—PCT/US2019/052443—ISA/EPO—Dec. 4, 2019 (18 pp).

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

ITU-T H.265, Series H: Audiovisual and Multimedia Systems, Infrastructure of audiovisual services—Coding of moving video, Advanced video coding for generic audiovisual services, The International Telecommunication Union. Dec. 2016, 664 pp.

Lin Z-Y., et al., "CE10-Related: OBMC Bandwidth Reduction and line Buffer Reduction", 11th JVET Meeting; Jul. 11, 2018-Jul. 18, 2018; Ljubljana; (The Joint Video Exploration Team of ISO/IEC JTC1/SC29/WG11 and ITU-SG.16), No. JVET-K0259, Jul. 11, 2018, XP030199439, Retrieved from the Internet: URL:http://phenix.int-evry.fr/jvet/doc-end_user/documents/11_Ljubljana/wg11/JVET-K0259-v2.zip JVET-K0259-v2.docx [retrieved on Jul. 11, 2018], 11 pages.

Pham Van L., et al., "CE2-Related: 4×4 Chroma Affine Motion Compensation and Motion Vector Rounding Unification", Joint Video Experts Team (JVET) of ITU-T SG 16 WP 3 and ISO/IEC JTC 1/SC 29/WG 11, JVET-M0462-v2, Jan. 9-18, 2019, 4 pages.

Pham Van L., et al., "CE6-related: Transform Skip for 2×2 Chroma Blocks and Disable 2×2 Chroma blocks in Intra Slices", Joint Video Experts Team (JVET) of ITU-T SG 16 WP 3 and ISO/IEC JTC 1/SC 29/WG 11, JVET-L0407-v2, Oct. 3-12, 2018, 3 pages.

Tamse A., et al., "CE2-Related: MV Derivation for Affine Chroma", Joint Video Experts Team (JVET) of ITU-T SG 16 WP 3 and ISO/IEC JTC 1/SC 29/WG 11, JVET-M0192-V1, Jan. 9-18, 2019, 5 pages.

Yang H., (Huawei): "BoG Report on CE4 Related Contributions", 11th JVET Meeting; Jul. 11, 2018-Jul. 18, 2018; Ljubljana; (The Joint Video Exploration Team of ISO/IEC JTC1/SC29/WG11 and ITU-T SG.16), No. JVET-K0546, Jul. 14, 2018, XP030199811, Retrieved from the Internet: URL:http://phenix.int-evry.fr/jvet/doc_end_user/documents/11_Ljubljana/wg11/JVET-K0546-v1.zip JVET-K0546.docx [retrieved on Jul. 14, 2018], 12 pages.

Zhang K., et al., "CE4: Affine Prediction with 4×4 Sub-blocks for Chroma Components (Test 4.1.16)", Joint Video Experts Team (JVET) of ITU-T SG 16 WP 3 and ISO/IEC JTC 1/SC 29/WG 11, JVET-L0265, Oct. 3-12, 2018, 2 pages.

Zhou M., et al., "CE2: On Restriction of Memory Bandwidth Consumption of Affine Mode (CE2-4.8)", Joint Video Experts Team (JVET) of ITU-T SG 16 WP 3 and ISO/IEC JTC 1/SC 29/WG 11, JVET-N0068-v2, Mar. 19-27, 2019, 12 pages.

Zhou M., et al., "CE2-related: A Restriction on Memory Bandwidth Consumption of Affine Mode", Joint Video Experts Team (JVET) of ITU-T SG 16 WP 3 and ISO/IEC JTC 1/SC 29/WG 11, JVET-M0049-V2, Jan. 9-18, 2019, 12 pages.

Zhou M., et al., "Comments on Test Model Development", 10th JVET Meeting; Apr. 10, 2018-Apr. 20, 2018; San Diego; (The Joint Video Exploration Team of ISO/IEC JTC1/SC29/WG11 and ITU-T SG.16 ); URL: http://phenix.int-evry.fr/jvet/,,No. JVET-J0081, Apr. 16, 2018, XP030151279, 2 pages.

Zhou M., et al.,(Broadcom): "Non-CE9: A Computational Complexity Analysis for DMVR", 11 th JVET Meeting; Jul. 11, 2018-Jul. 18, 2018; Ljubljana; (The Joint Video Exploration Team of ISO/IEC JTC1/SC29/WG11 and ITU-T SG.16), No. JVET-K0480 Jul. 11, 2018, XP030199484, Retrieved from the Internet: URL:http://phenix.int-evry.fr/vet/doc_end_user/documents/11_Ljubljana/wg11/JVET-K0480-v1.zip JVET-K0480_v1.docx [retrieved on Jul. 11, 2018], 4 pages.

Bross B., et al., "Versatile Video Coding (Draft 2)", Joint Video Experts Team (JVET) of ITU-T SG 16 WP 3 and ISO/IEC JTC 1/SC 29/WG 11, JVET-K1001-v4, 11th Meeting: Ljubljana, SI, Jul. 10-18, 2018, 86 pages.

* cited by examiner

RESTRICTIONS FOR THE WORST-CASE BANDWIDTH REDUCTION IN VIDEO CODING

This application claims the benefit of U.S. Provisional Application No. 62/735,723, filed Sep. 24, 2018, and U.S. Provisional Application No. 62/737,604, filed Sep. 27, 2018, the entire contents of each of which are hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

This disclosure generally relates to techniques for reducing an amount of memory bandwidth used to predict samples of video data. A video coder (e.g., a video encoder or a video decoder) may predict samples of a current block of video data based on samples of one or more reference blocks of video data, referred to as reference samples. In order to predict the samples of the current block from the reference samples, the video coder must retrieve the reference samples from memory. The amount of memory bandwidth used by the video coder to predict samples of a current block of video data may be the number of reference samples retrieved. Retrieving reference samples from memory may consume power and add processing time. As such, in some examples, it may be desirable to minimize the memory bandwidth used by the video coder.

In accordance with one or more techniques of this disclosure, a video coder may impose one or more constraints to reduce the amount of memory bandwidth used to predict samples of a current block of video data. For instance, the video coder may determine a memory bandwidth needed for a current block, and may selectively modify a motion compensation method used to predict samples of the current block based on whether the determined memory bandwidth for the current block satisfies a bandwidth threshold. In this way, the video coder may reduce the amount of power consumed and/or the processing time required to predict the samples of the current block.

In one example, a method includes obtaining values of control point motion vectors (CPMVs) for a current block of video data selected for coding using affine mode; determining whether a memory bandwidth needed for accessing samples of a plurality of reference blocks derived based on the values of the CPMVs satisfies a bandwidth threshold; selectively modifying, based on whether the memory bandwidth satisfies the bandwidth threshold, a motion compensation method used to predict samples of the current block of video data; and predicting, using the selectively modified motion compensation method, the samples of the current block of video data from the samples of the plurality of reference blocks.

In another example, a device for coding video data includes: a memory configured to store the video data; and one or more processors implemented in circuitry and configured to: obtain values of control point motion vectors (CPMVs) for a current block of video data selected for coding using affine mode; determine whether a memory bandwidth needed for accessing samples of a plurality of reference blocks derived based on the values of the CPMVs satisfies a bandwidth threshold; selectively modify, based on whether the memory bandwidth satisfies the bandwidth threshold, a motion compensation method used to predict samples of the current block of video data; and predict, using the selectively modified motion compensation method, the samples of the current block of video data from the samples of the plurality of reference blocks.

In another example, a computer-readable storage medium stores instructions that, when executed, cause one or more processors of a video coder to: obtain values of control point motion vectors (CPMVs) for a current block of video data selected for coding using affine mode; determine whether a memory bandwidth needed for accessing samples of a plurality of reference blocks derived based on the values of the CPMVs satisfies a bandwidth threshold; selectively modify, based on whether the memory bandwidth satisfies the bandwidth threshold, a motion compensation method used to predict samples of the current block of video data; and predict, using the selectively modified motion compensation method, the samples of the current block of video data from the samples of the plurality of reference blocks.

In another example, a device for coding video data includes: means for obtaining values of control point motion vectors (CPMVs) for a current block of video data selected for coding using affine mode; means for determining whether a memory bandwidth needed for accessing samples of a plurality of reference blocks derived based on the values of the CPMVs satisfies a bandwidth threshold; means for selectively modifying, based on whether the memory bandwidth satisfies the bandwidth threshold, a motion compensation method used to predict samples of the current block of video data; and means for predicting, using the selectively modified motion compensation method, the samples of the current block of video data from the samples of the plurality of reference blocks.

The details of one or more examples of this disclosure are set forth in the accompanying drawings and the description below. Other features, objects, and advantages of various aspects of the techniques will be apparent from the description and drawings, and from the claims.

DETAILED DESCRIPTION

Figure 1:
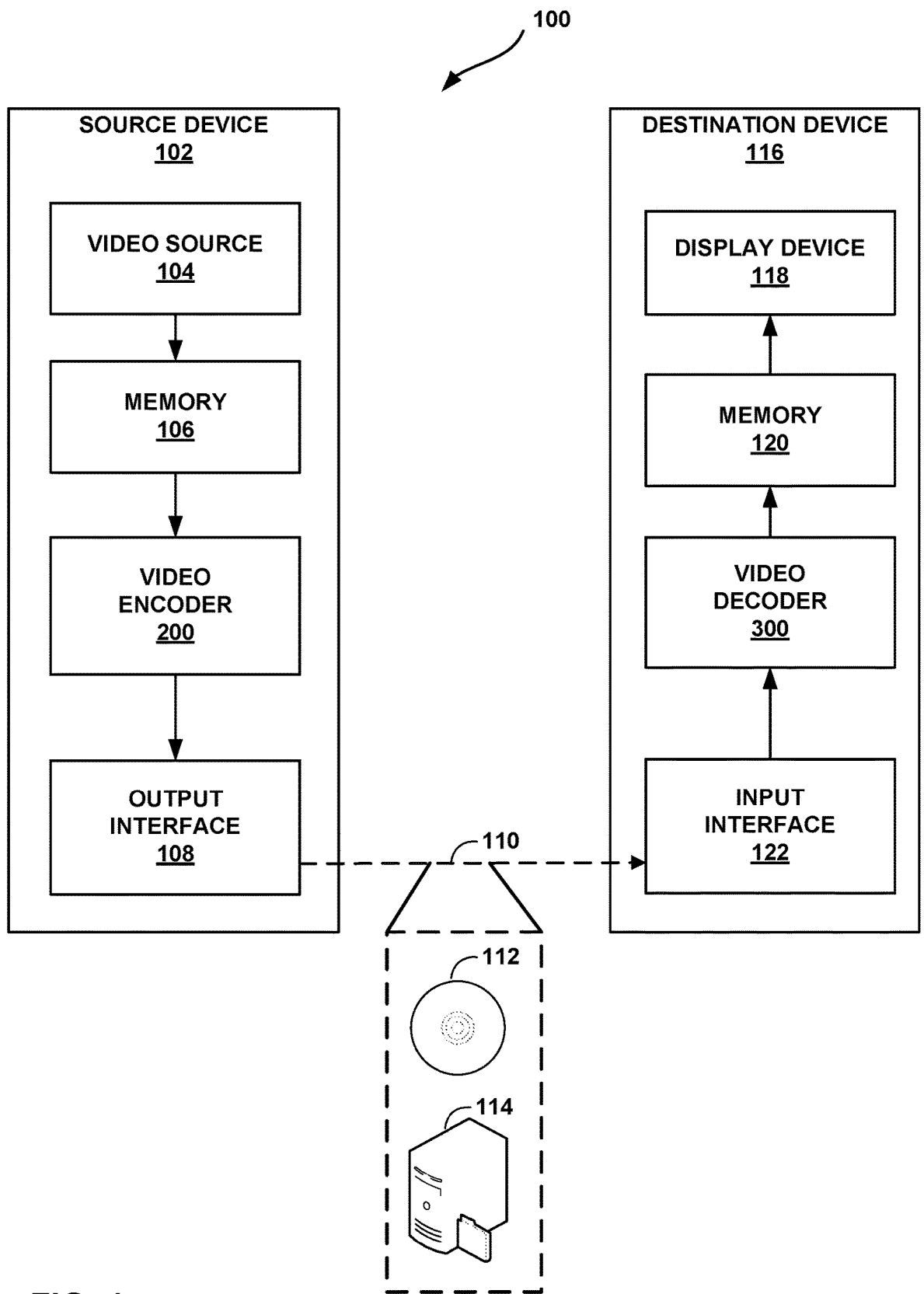
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for memory bandwidth reduction of affine coded video data. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for memory bandwidth reduction of affine coded video data. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 2)," Joint Video Experts Team (JVET) of ITU-T SG 16 WP 3 and ISO/IEC JTC 1/SC 29/WG 11, 11th Meeting: Ljubljana, SI, 10-18 Jul. 2018, JVET-12001-vE (hereinafter "VVC Draft 2"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns.

Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
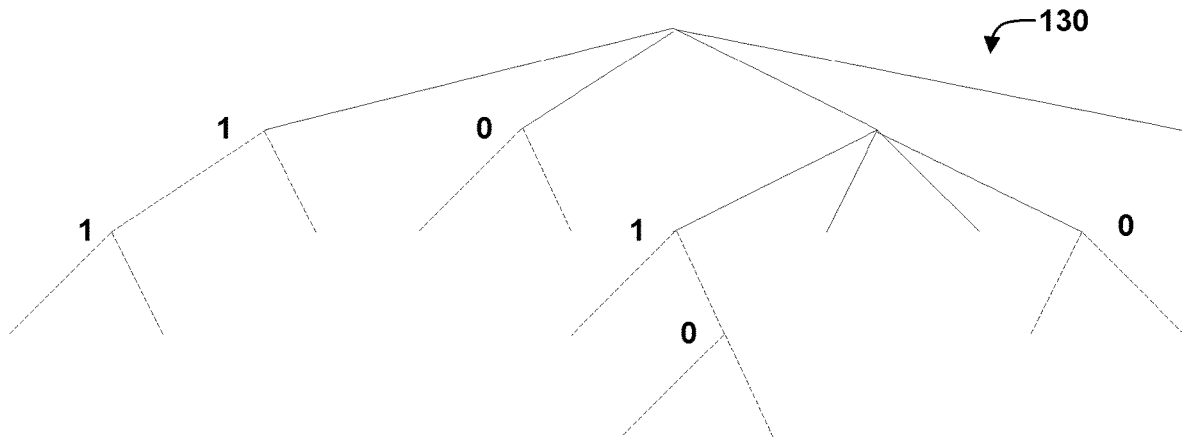
FIGS. 2A and 2B are conceptual diagrams illustrating an example quadtree binary tree (QTBT) structure, and a corresponding coding tree unit (CTU).
Figure 2B:
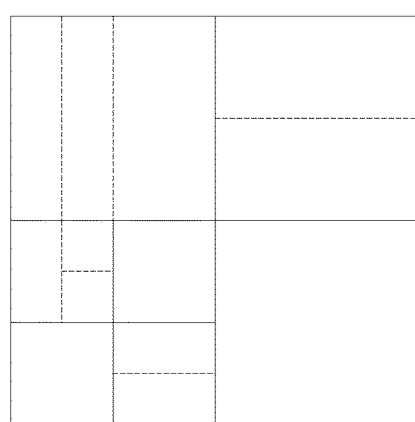

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3A:
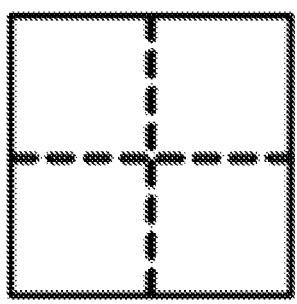
FIGS. 3A-3E are conceptual diagrams illustrating example partitions of video data.
Figure 3B:
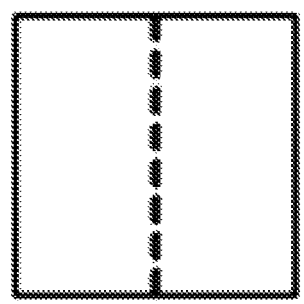
Figure 3C:
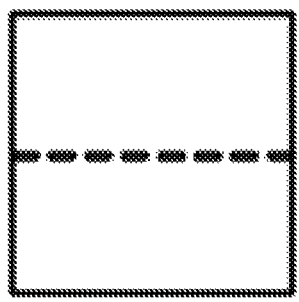
Figure 3D:
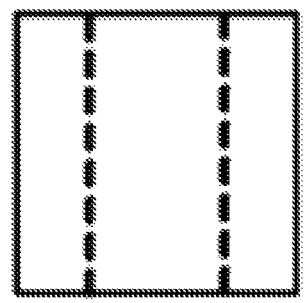
Figure 3E:
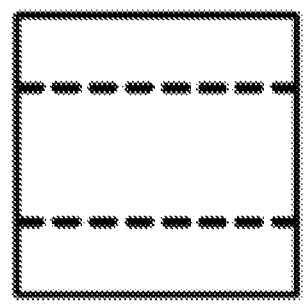

FIGS. 3A-3E are conceptual diagrams illustrating example partitioning of blocks of video data. As discussed above, the tree structure used in VVC is a generalization of the QT-BTT (Quad-tree plus Binary and Triple tree). The fundamental structure of this structure may include two types of tree nodes: Region Tree (RT) and Prediction Tree (PT), supporting five types of partitions, as shown in FIGS. 3A-3E. Specifically, FIG. 3A shows quad-tree partitioning, FIG. 3B shows vertical binary-tree partitioning, FIG. 3C shows horizontal binary-tree partitioning, FIG. 3D shows vertical triple-tree partitioning, and FIG. 3E shows horizontal triple-tree partitioning. A region tree can recursively split a CTU into square blocks down to a 4×4 size region tree leaf node. At each node in a region tree, a prediction tree can be formed from one of three tree types to form coding units (CUs): Binary Tree, Triple Tree. In a PT split, having a quadtree partition in branches of the prediction tree may be prohibited.

A CTU may include a luma coding tree block (CTB) and two chroma coding tree blocks. At the CU level, a CU may be associated with a luma coding block (CB) and two chroma coding blocks. As in JEM (the reference software of the VVC), the luma tree and the chroma tree may be separated into intra slices while they are shared in inter slices. The size of a CTU can be 128×128 (luma component) while the size of a coding unit can range from 4×4 to the size of CTU. In this scenario, the size of a chroma block can be 2×2 in 4:2:0 color format.

Like to HEVC, VCC supports a transform skip mode. When a video coder applies transform skip mode to the residual of a CU, the video coder may not preform the transform, and may carry out the quantization on the residual. To select the optimal transform mode for a TU of the CU), the video encoder may test both transform and transform skip modes. The video encoder may encode (e.g., signal in a bitstream) a syntax element (e.g., transform_skip_ flag) to the decoder to indicate the transform mode of a TU. In the picture level, the video encoder may indicate the use of the transform skip mode by signalling a syntax element (e.g., a flag) in a picture parameter set (PPS).

In VVC, a video encoder may encode a block in an inter slice using inter prediction mode where the prediction value of the block is obtained using a block matching algorithm. The video encoder may search reference frames within a window centered by a motion vector predictor (derived by the AMVP process) to find the best match of the block. For instance, the video encoder may, as part of a motion estimation process, evaluate multiple motion vectors in the integer accuracy level. Once the best match in the integer level is obtained, the video encoder may further refine the best match by an interpolation process (e.g., in a half and quarter-pel).

In the JEM, a locally adaptive motion vector resolution (LAMVR) is introduced. LAMVR allows for the motion vector difference (MVD) to be coded in units of quarter luma samples, integer luma samples, or four luma samples. The motion vector difference (MVD) resolution may be controlled at the CU level, and MVD resolution flags may conditionally signalled for each CU that has at least one non-zero MVD components.

For a CU that has at least one non-zero MVD component (e.g., the x-component or the y-component is non-zero), a video encoder may signal a first flag to indicate whether quarter luma sample MV precision is used in the CU. When the first flag indicates that quarter luma sample MV precision is not used (e.g., the first flag is equal to 1), the video coder may signal another flag to indicate whether integer luma sample MV precision or four luma sample MV precision is used.

When a first MVD resolution flag of a CU is zero, or not coded for a CU (meaning all MVDs in the CU are zero), the video coder may use the quarter luma sample MV resolution for the CU. When a CU uses integer-luma sample MV precision or four-luma-sample MV precision, the video coder may round the MVPs in the AMVP candidate list for the CU to the corresponding precision.

The video coder may perform sub-block motion compensation for advanced temporal motion vector prediction (ATMVP) mode (e.g., in VVC). In ATMVP mode, the video coder may split a CU into sub blocks, named prediction units (PUs). The video coder may independently evaluate these PUs using motion vectors of the temporal collocated blocks in the previously encoded frames. The motion vectors of these PUs may, or may not, be different. In some examples, the block size of PUs may be fixed at 4×4. In such examples, to reconstruct each PU at the decoder side, the video decoder may access a block of the size 11×11 [(4+4+3)×(4+4+3)] in the memory (e.g., memory 120).

A video coder may utilize an affine coding mode (e.g., in VVC) to code a CU. An affine CU (e.g., a CU coded using affine mode) may be split into sub PUs that are evaluated independently. In contrast to ATMVP where the motion vector of a PU is obtained using motion vectors of the temporal collocated blocks, the video coder may derive the motion vector of each affine PU using the motion vectors of spatial neighbour CUs of the CU.

An affine motion model may be described as:

$$\begin{cases} v_x = ax + by + e \\ v_y = cx + dy + f \end{cases} \quad (1)$$

Figure 6:
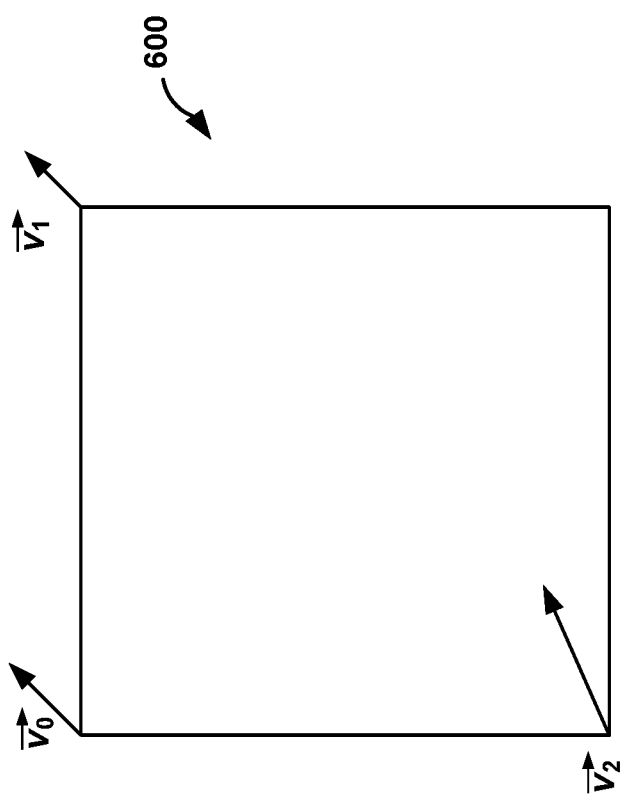
FIG. 6 is a conceptual diagram illustrating control points in affine mode.

$(v_x, v_y)$ is the motion vector at the coordinate (x,y), and a, b, c, d, e, and f are six parameters. The affine motion model for a block can also be described by the three motion vectors $\vec{v}_0=(v_{0x},v_{0y})$, $\vec{v}_1=(v_{1x},v_{1y})$, and $\vec{v}_2=(v_{2x},v_{2y})$ at the three corners of block 600 as shown in FIG. 6. These three motion vectors may be referred by as control point motion vectors (CPMVs). The motion field is then described as $$\begin{cases} v_x = \frac{(v_{1x} - v_{0x})}{w}x + \frac{(v_{2x} - v_{0x})}{h}y + v_{0x} \\ v_y = \frac{(v_{1y} - v_{0y})}{w}x + \frac{(v_{2y} - v_{0y})}{h}y + v_{0y} \end{cases} \quad (2)$$

where w and h are the width and height of the block. This disclosure refers to this affine motion model as 6-parameters affine motion model.

A simplified 4-parameters affine model is described as:

$$\begin{cases} v_x = ax - by + e \\ v_y = bx + ay + f \end{cases} \quad (3)$$

Similarly, the simplified 4-parameters affine model for a block can be described by two CPMVs $\vec{v}_0=(v_{0x},v_{0y})$ and $\vec{v}_1=(v_{1x},v_{1y})$ at the two corners of the block. The motion field is then described as $$\begin{cases} v_x = \frac{(v_{1x} - v_{0x})}{w}x - \frac{(v_{1y} - v_{0y})}{h}y + v_{0x} \\ v_y = \frac{(v_{1y} - v_{0y})}{w}x + \frac{(v_{1x} - v_{0x})}{h}y + v_{0y} \end{cases} \quad (4)$$

Currently, VVC allows affine type prediction. In some examples, affine type prediction in VVC may utilize one or both of the 6-parameters affine model or the simplified 4-parameters affine model.

However, in some examples, splitting the chroma components into blocks of size 2×2 may result in a high number of small blocks. Applying transforms (e.g., that may require transpose, multiplication and addition) to high numbers of small blocks may lead to an increase of cycles used for computation and/or may increase the processing time.

As discussed above, it may be desirable to reduce the memory bandwidth requirement (e.g., while keeping a good trade-off between bandwidth reduction and coding performance). The division of a CU into small blocks (e.g., 4×4 blocks) would greatly increase the memory bandwidth access due to motion compensation interpolation, requiring neighbor samples of the reference 4×4 block to be fetched (e.g., obtained from memory) since they are used in the interpolation.

For purposes of the below discussion, memory bandwidth is calculated as number of reference pixels (e.g., reference samples) necessary for interpolation. In real hardware implementations, actual bandwidth may also depend on hardware architecture and can be greater than a number of accessed pixels.

A worst case (for memory bandwidth purposes) for inter mode (Merge and AMVP modes) may be 4×4 bi-directional prediction blocks with fractional pel motion vectors (MV) from both directions. For this case, two 11×11 (121 pixels) luma blocks may need to be accessed from memory to perform interpolation, and two corresponding chroma blocks for U and V color components of the size 5×5 have to be fetched. In this calculation it is assumed that an 8-tap filter is used for luma component interpolation and a 6-tap filter is used for chroma components interpolation. Another case contributing to the worsening bandwidth is in the ATMVP and affine modes, where the motion vectors of sub-PUs associated with a CU may lead to fetching of non-overlapping areas from the memory.

Figure 7:
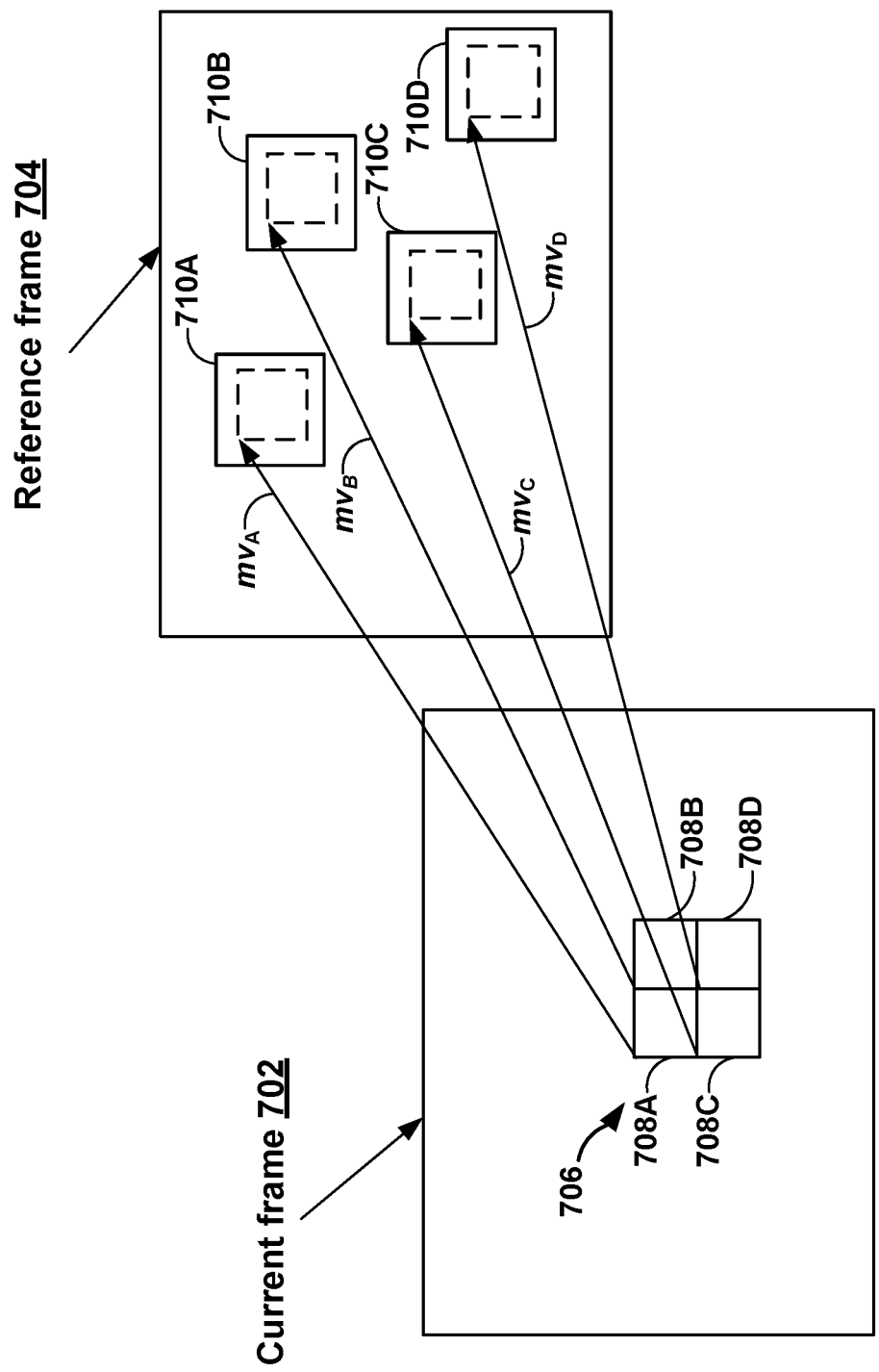
FIG. 7 is a conceptual diagram illustrating non-overlapping references areas used to reconstruct a current block, in accordance with one or more aspects of this disclosure.

FIG. 7 is a conceptual diagram illustrating non-overlapping references areas used to reconstruct a current block, in accordance with one or more aspects of this disclosure. As shown in FIG. 7, to reconstruct current CU 706 of current frame 702, a video coder may access several regions of reference frame 704 (e.g., regions of reference frame 704 that are stored in a reference picture buffer, such as decoded picture buffer 218 of FIG. 4 or decoded picture buffer 213 of FIG. 5). Specifically, current CU 706 may be divided into sub-blocks 708A-708D (collectively, "sub-blocks 708"), that are each associated with a sub-block motion vector of sub-block motion vectors $mv_A$-$mv_D$. Each of sub-blocks 708 may be a prediction unit PU (e.g., of size 4×4). As shown in FIG. 7, each of sub-block motion vectors $mv_A$-$mv_D$ identifies a respective reference region of reference regions 710A-710D (collectively, "reference regions 710") in reference frame 704. It is noted that each of reference regions 710 includes a block directly identified by a sub-block motion vector and an area around the block that includes samples accessed by filter taps. To reconstruct current CU 706, the video coder may need to fetch, access, or otherwise obtain samples of each of reference regions 710 from memory. As shown in the example of FIG. 7, reference regions 710 may be entirely non-overlapping (e.g., meaning that any sample from a particular reference region of reference regions 710 is not included in any other reference region of reference regions 710). For these worst bandwidth cases mentioned above, the number of pixels to be fetched per pixel for 2D interpolation is summarized in Table 1, below.

TABLE 1

Number of pixels for 2D interpolation in JEM

| Worst case | Luma | Chroma | Fetched pixels per luma pixel |
| --- | --- | --- | --- |
| 4 × 4 Merge and AMVP | 11 × 11 · 2 | (5 × 5 · 2) · 2 | 21.4 |
| 4 × 4 non-overlapped fetching for ATMVP/Affine PU | 11 × 11 | (5 × 5 · 2) | 10.7 |

As discussed above, in some examples, the reference regions accessed to reconstruct a coding unit may be non-overlapping. In other examples, the reference regions accessed to reconstruct a coding unit may be overlapping. Overlapping reference regions may provide some efficiencies to a video coder. For instance, a video coder may only need to access samples of overlapping reference regions once, resulting in memory bandwidth saving.

Figure 8:
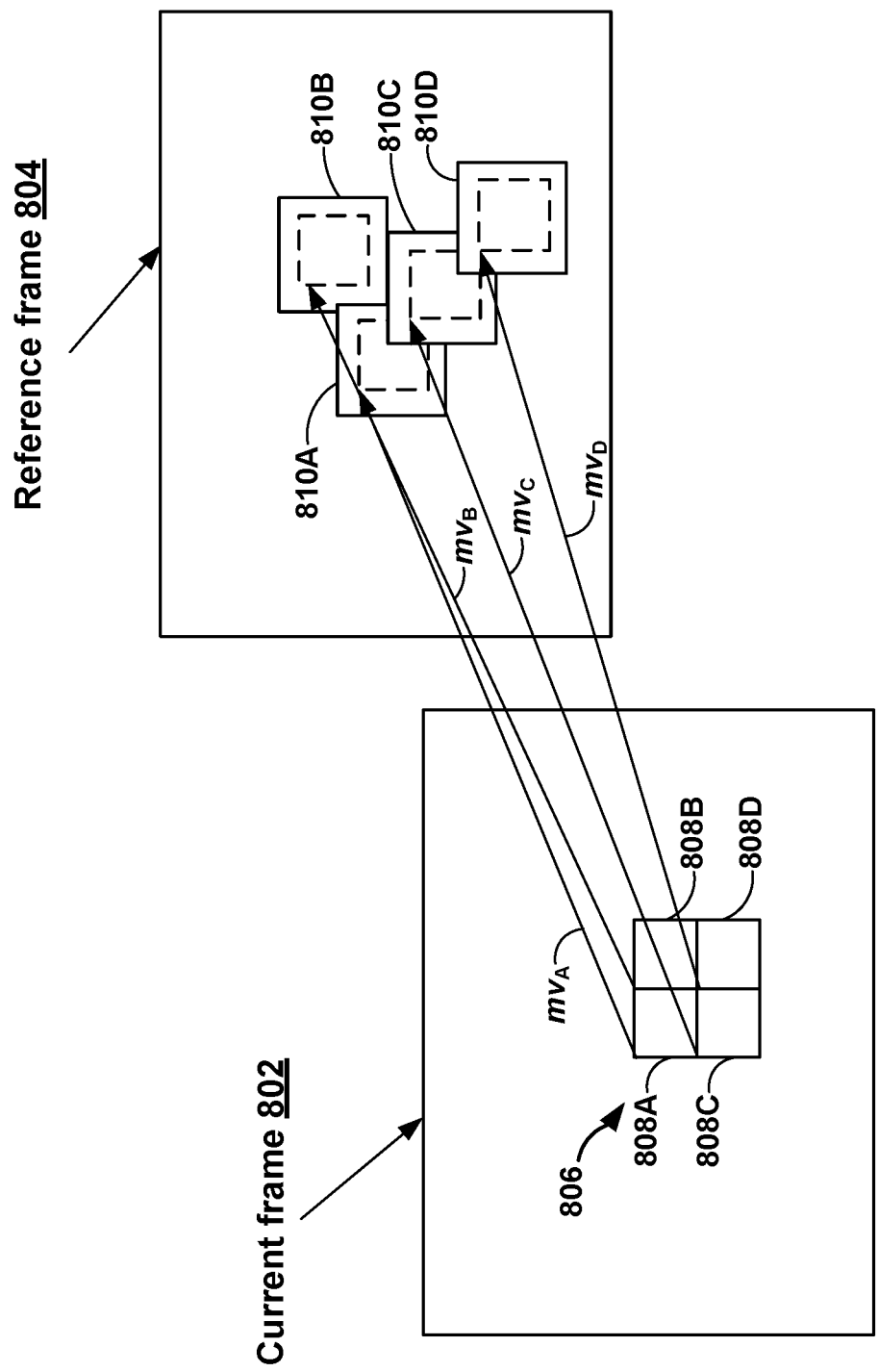
FIG. 8 is a conceptual diagram illustrating overlapping references areas used to reconstruct a current block, in accordance with one or more aspects of this disclosure.

FIG. 8 is a conceptual diagram illustrating overlapping references areas uses to reconstruct a current block, in accordance with one or more aspects of this disclosure. As shown in FIG. 8, to reconstruct current block 806 (e.g., current CU) of current frame 802, a video coder may access several regions from reference frame 804 (e.g., that are stored in a reference picture buffer, such as decoded picture buffer 218 of FIG. 4 or decoded picture buffer 213 of FIG. 5). Specifically, current block 806 may be divided into sub-blocks 708A-708D, that are each associated with a sub-block motion vector of sub-block motion vectors $mv_A$-$mv_D$. As shown in FIG. 8, each of sub-block motion vectors $mv_A$-$mv_D$ identifies a respective reference region of reference regions 810A-810D (collectively, "reference regions 810") in reference frame 804. It is noted that each of reference regions 810 includes a block directly identified by a sub-block motion vector (dotted line) and an area around the block that includes samples accessed by filter taps (solid line). To reconstruct current block 806, the video coder may need to fetch, access, or otherwise obtain samples of each of reference regions 810 from memory. As shown in the example of FIG. 8, reference regions 810 may be partially overlapping (e.g., meaning that some samples sample from a first reference region of reference regions 810 are also located in a second reference region of reference regions 810).

The larger overlapped area may yield a higher bandwidth saving compared to individual fetching for each 4×4 PUs. The bandwidth saving BS can be calculated as:

$$BS = \frac{(KN - F)}{KN} 100(\%) \quad (5)$$

where K, N, and F are the number of fetched points for a 4×4 PU, the number of PUs associated with the CU, and the number of fetched points need to encode the CU in the affine mode, respectively.

This disclosure describes several techniques to solve the aforementioned problems including simplification of transform for 2×2 blocks and reduction in the bandwidth usage for memory accessing. The techniques of this disclosure may be used independently, or may be combined.

In accordance with a first technique, a video coder (e.g., video encoder 200 and/or video decoder 300) may the transform for 2×2 blocks. As one example, the video coder may force 2×2 chroma blocks to coded in transform skip mode. As such, the residual of the 2×2 chroma blocks may be quantized directly in the pixel domain. The transform skip for the 2×2 chroma block is always applied, therefore, the transform skip flag is no longer signaled in the bit stream for those blocks. With the use of this technique, the processing time may be reduced because the transform is not applied and the transform skip may be simply carried out by a bit shift operation. Moreover, the transform_skip_flag syntax is removed that may improve the compression efficiency. For instance, responsive determining to partition video data into at least one 2×2 chroma block, a video coder may code the 2×2 chroma block using transform skip mode.

As another example, the residual can be always forced to be zero for 2×2 chroma blocks, in this case transform is also bypassed, coded block pattern (CBP) flags signalling for such chroma blocks, indicating whether residual is zero, can be omitted to reduce overhead. In one example, in inter mode it (e.g., whether the residual is zero) can be indicated by using a skip mode, which always have zero residual. For instance, responsive determining to partition video data into at least one 2×2 chroma block, a video coder may code the 2×2 chroma block to have zero residual value (e.g., select a predictor block that, at least after quantization, perfectly matches the 2×2 chroma block).

If separate tree coding is applied, meaning that luma and chroma components may have different partition structures, the partition splitting to 2×2 chroma blocks may be prohibited, in such case there are no 2×2 chroma blocks. Whether to prohibit 3×3 chroma blocks or not may depend on the prediction mode. For example, 3×3 chroma blocks may be prohibited for intra mode, but may be allowed for inter mode. Intra mode has additional dependency because the prediction is done using neighboring samples, which adds additional burden as compared to inter mode.

The described techniques may be applied either to one of the following cases on in any combination: to intra 2×2 chroma blocks in an I-slice, or may be applied to chroma 2×2 blocks coded in intra mode regardless of the slice type, or be applied to 2×2 chroma blocks coded in inter mode.

As discussed above and in accordance with one or more techniques of this disclosure, a video coder (e.g., video encoder 200 and/or video decoder 300) may impose one or more constraints to reduce the amount of memory bandwidth used to predict samples of video data. For instance, the video coder may determine a memory bandwidth needed for a current block and may selectively modify a motion compensation method used to predict samples of the current block based on whether the determined memory bandwidth for the current block satisfies a bandwidth threshold. In this way, the video coder may reduce the amount of power consumed and/or the processing time required to predict the samples of the current block.

As discussed above, in some examples, the video coder may determine a memory bandwidth needed for a current block. The video coder may determine the memory bandwidth needed for a block coded using affine mode based on values of affine motion model parameters of the block (e.g., based on control point motion vectors (CPMVs) of the block). As discussed above with reference to equations (1) and (2), an affine motion model may include four or six parameters. A four-parameter affine motion model may be implicitly expressed as two CPMVs (e.g., $\vec{v}_0=(v_{0x},v_{0y})$ and $\vec{v}_1=(v_{1x},v_{1y})$), and a six-parameter affine motion model may be implicitly expressed as three CPMVs ($\vec{v}_0=(v_{0x},v_{0y})$, $\vec{v}_1=(v_{1x},v_{1y})$, and $\vec{v}_2=(v_{2x},v_{2y})$). As such, a determination based on CPMVs may be considered to be a determination based on affine model parameters, and vice versa.

The affine model parameters a, b, c, d determine how far the sub-block motion vectors can go apart from each other within a PU. In the worst case, the sub-block vectors can go so far apart that there is zero overlap among reference regions used for the motion compensation (e.g., as shown in the example of FIG. 7). As discussed above, reduced overlap among reference region leads to increased memory bandwidth requirements. A scenario where there is zero overlap among reference regions may be referred to as a "worst case" scenario for memory bandwidth because a maximum number of reference samples may need to be accessed from memory (e.g., memory 106, memory 120). As such, this disclosure proposes a technique in which a video coder selectively adjusts, based on a memory bandwidth needed to access reference samples for a current block coded using affine mode, a motion compensation method used to predict samples of the current block.

In some examples, the video coder may determine whether the memory bandwidth needed for a current block based on differences between values of CPMVs of the current block. The differences between the values of the CPMVs may indicate how far apart reference regions 810 are from each other. As discussed above, the farther apart reference regions 810 are from each other, the more bandwidth will be needed for the current block. The video coder may determine the differences between the values of the CPMVs by determine a difference between a largest and a smallest CPMV (in both horizontal and vertical directions). For instance, the video coder may identify a largest horizontal component of the CPMVs, a largest vertical component of the CPMVs, a smallest vertical component of the CPMVs, and a smallest horizontal component of the CPMVs. The video coder may subtract the identified smallest horizontal component from the identified largest horizontal component to determine a horizontal difference and subtract the identified smallest vertical component from the identified largest vertical component to determine a vertical difference. The video coder may determine whether the memory bandwidth needed for the current block based on the horizontal difference and the vertical difference.

As discussed above, the video coder may selectively modify a motion compensation method used to predict samples of the current block based on whether the determined memory bandwidth for the current block satisfies a bandwidth threshold. The video coder may compare the determined memory bandwidth with a predetermined bandwidth threshold. The bandwidth threshold may be predefined in a profile or may be passed to the video coder as a parameter.

To selectively modify the motion compensation method, the video coder may modify (e.g., change, alter, or otherwise adjust) the motion compensation method in response to determining that the memory bandwidth does not satisfy the bandwidth threshold. Similarly, the video coder may not modify the motion compensation method in response to determining that the memory bandwidth does not satisfy the bandwidth threshold. In some examples, the video coder may determine that the memory bandwidth satisfies the bandwidth threshold where the determined memory bandwidth is less than or equal to (e.g., < or =) the bandwidth threshold. In some examples, the video coder may determine that the memory bandwidth satisfies the bandwidth threshold where the determined memory bandwidth is less than (e.g., <) the bandwidth threshold. In some examples, the video coder may determine that the memory bandwidth does not satisfy the bandwidth threshold where the determined memory bandwidth is greater than (e.g., >) the bandwidth threshold. In some examples, the video coder may determine that the memory bandwidth does not satisfy the bandwidth threshold where the determined memory bandwidth is greater than or equal to (e.g., > or =) the bandwidth threshold.

The video coder may modify the motion compensation method in any number of ways. For example, the video coder may modify the motion compensation method used to predict samples of the current block in a manner that will reduce the memory bandwidth needed to predict the samples of the current block (e.g., relative to the unmodified motion compensation method). Some example modifications to motion compensation methods include, but are not limited to, modifying a sub-block size, modifying a number of filter taps used for interpolation, coding the current block using a simple mode, or any other modification that reduces the memory bandwidth needed to predict the samples of the current block. In this way, the video coder may selectively modify, based on whether the determined memory bandwidth satisfies the bandwidth threshold, the motion compensation method used to predict samples of the current block of video data.

To modify a sub-block size, the video coder may group together one or more sub-blocks in order to reduce a number of sub-blocks of the current block. For instance, the video coder may change from using 4×4 sub-blocks to using 8×8 sub-blocks. The video coder may predict the grouped block using a motion vector that is derived using the motion vectors of the corresponding sub-blocks (e.g., that are included in the grouped block). In some examples, the video coder may derive the motion vector by averaging the motion vectors of the corresponding sub-blocks. As one example, if the grouped block is square (width and height are identical), the video coder may utilize the average motion vector of all corresponding sub-blocks as the motion vector of the grouped block. As another example, the video coder may utilize an average of a subset of the motion vectors of the corresponding sub-blocks as the motion vector of the grouped block. For instance, the video coder may utilize an average of motion vectors of a diagonal set sub-blocks (e.g., top left and bottom right, or top right and bottom left) as the motion vector of the grouped block. In some examples, the video coder may utilize the motion vector of a particular sub-block of the corresponding sub-blocks as the derived motion vector. Modifying the sub-block size may reduce the memory bandwidth as fewer reference regions may be required.

To modify the number of filter taps, the video coder may reduce a number of filter taps used for interpolation. In one example, the 4-tap chroma interpolation filter may be used for interpolation of the luma component instead of the original 8-tap luma interpolation filter. By reducing the number of filter taps, the video coder may reduce a size of the reference regions (e.g., as interpolation in equations (6)/(8) and/or interpolation Y in equations (7)/(9) will be reduced).

The video coder may predict, using the selectively modified motion compensation method, the samples of the current block of video data from the samples of the plurality of reference blocks. For instance, the video coder may obtain (e.g., from memory) the samples of the plurality of reference blocks and add the obtained samples to residual data to reconstruct samples of the current block.

Figure 4:
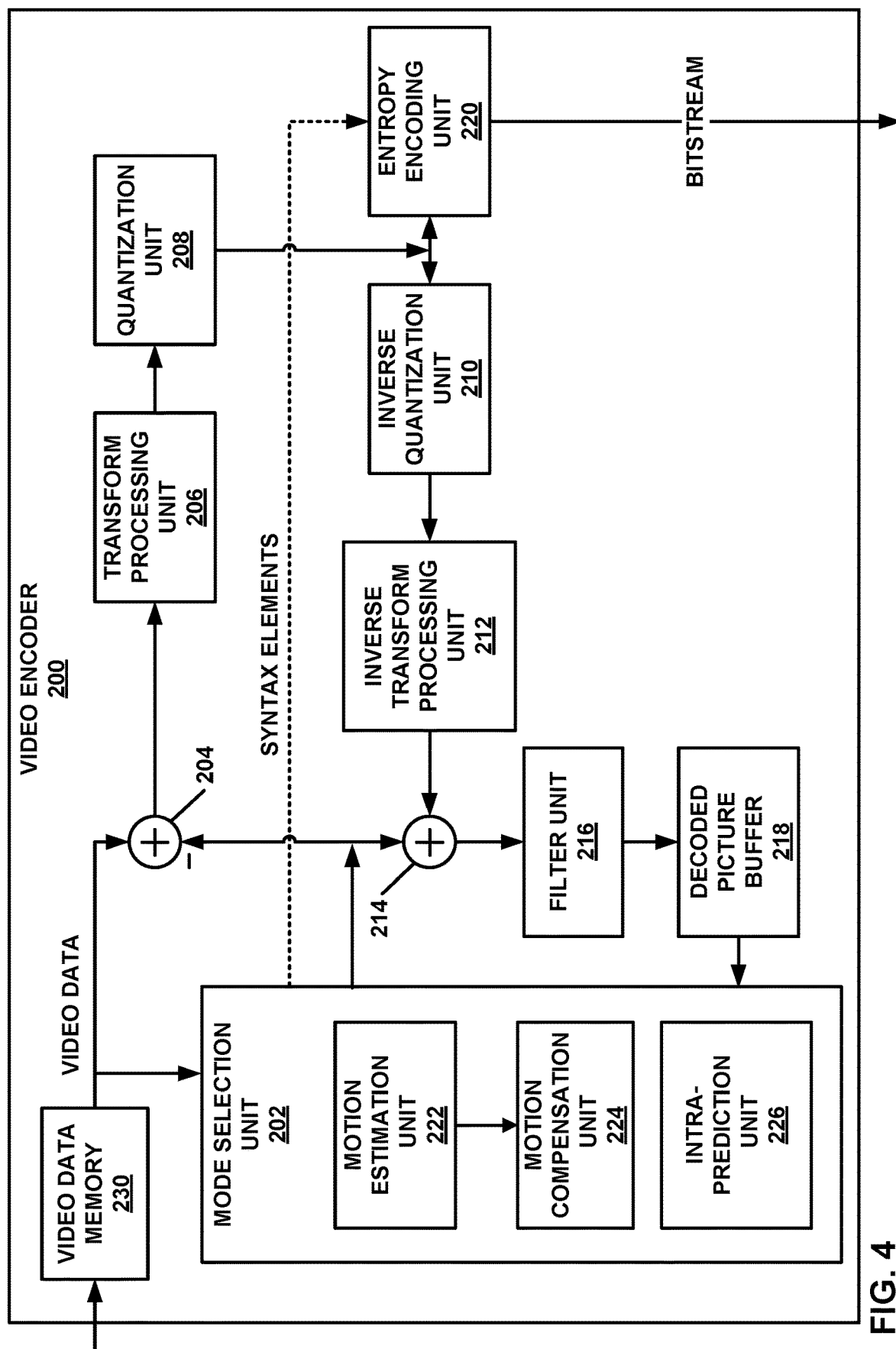
FIG. 4 is a block diagram illustrating an example video encoder that may perform the techniques of this disclosure.

FIG. 4 is a block diagram illustrating an example video encoder 200 that may perform the techniques of this disclosure. FIG. 4 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 4, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 4 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

As discussed above and in accordance with one or more techniques of this disclosure, a video coder (e.g., video encoder 200 and/or video decoder 300) may reduce the amount of memory bandwidth used to predict samples of video data. In some examples, bandwidth reduction may be accomplished by limiting the number of pixels accessed for interpolation.

As one example bandwidth reduction technique, the video coder may round motion vectors (MVs) for the merge and AMVP modes of 4×4 CUs. The video coder may round MV candidates in the merge candidate lists and AMVP motion vector candidate lists. In some examples, the video coder may not signal (e.g., in the bitstream) the first motion vector difference (MVD) resolution flag that indicates whether the quarter luma sample MV precision. Extending this rounding, the MVD may be made integer for corresponding rounded MV components, so the video coder may signal MVD>>2.

A video decoder, such as video decoder 300, may reconstruct a motion vector in accordance with the following formula:

$$MV=[MVP]+(MVD\ll 2) \quad (18)$$

where brackets stand for rounding operation, MV is the value of the motion vector, MVP is the value of the motion vector prediction, and MVD is the value of the motion vector difference. MVD parsing is not affected by this shift and MV can be adjusted at reconstruction stage. The number of accessed reference pixels and the reduction of this worst-case bandwidth are summarized below in Table 2.

As one example bandwidth reduction technique, the video coder may fix the sub-PU size in the ATMVP mode to 8×8. When the size is set 4×4, the video coder may access (e.g., from memory) an 11×11 block (121 pixels) to perform motion compensation. An 8×8 area contains four 4×4 PUs. Therefore, the memory will be accessed four times and the total accessed points is 484 (4×121). However, when the size of PU is set to 8×8, the video coder may only need to access (from memory) a block of (7+8)×(7+8)=225 points for the luma component and two chroma blocks of 7×7. This memory access may only need to be performed once. The number of accessed reference pixels and the reduction of this worst-case bandwidth are summarized below in Table 2. As shown in Table 2, by fixing the sub-PU size of ATMVP to 8×8, the bandwidth may be reduced by 53.3% compared to the number of accessed points when the size of PU is set 4×4.

TABLE 2

Proposed worst-case bandwidth reduction

| Solution for bandwidth reduction | Luma | Chroma | Fetched pixels per luma pixel | Bandwidth reduction |
|---|---|---|---|---|
| Rounding motion vectors (worst case is 4 × 4 bi) | 4 × 4 · 2 | (2 × 2 · 2) · 2 | 3.0 | 18.4 or 86% |
| Fixed 8 × 8 PU size for ATMVP/Affine | 15 × 15 | 7 × 7 · 2 | 5.0 | 5.7 or 53.3% |

In some examples, the video coder may impose one or more constraints to reduce the amount of memory bandwidth used to predict samples of video data in the affine mode. As one example, the video coder may reduce the memory bandwidth for the affine mode by restricting the motion vector difference between the affine control points (also named as the control points difference). For instance, the video coder may determine a memory bandwidth needed for a current block (e.g., based on the control points for the current block). The video coder may compare the determined memory bandwidth with a predetermined bandwidth threshold (e.g., to ensure the memory bandwidth saving should not be smaller than a predefined memory bandwidth saving amount). The bandwidth threshold may be predefined in a profile or may be passed to the video coder as a parameter. The video coder may selectively modify a motion compensation method used to predict samples of the current block based on whether the determined memory bandwidth for the current block satisfies the bandwidth threshold.

The video coder may modify the motion compensation method in any number of ways. As one example, if the determined bandwidth (e.g., control points difference) is smaller than the bandwidth threshold, the video coder may modify the motion compensation by affine testing the CU using 4×4 subblocks (namely 4×4 affine mode). Otherwise, the video coder may affine test the CU using 8×8 subblocks (8×8 affine mode) or using SBWidth×SBHeight subblocks (where either SBWidth or SBHeight is greater than 4), instead of the 4×4 affine mode, or it is simply disallowed in order to meet the target bandwidth reduction.

The video coder may apply the constraint to either L0 or L1 motion directions separately. As such, it is possible to have 4×4 subblock in either one motion direction or SBWidth×SBHeight in another motion direction. Alternatively, the video coder may apply the constraint to both motion lists to determine the subblock size, meaning both L0 and L1 should have the same subblock size depends on whether both directions satisfy the constraint.

The video coder may perform normalization of the motion vector difference. For instance, as the motion vectors of each affine sub block are calculated based on the size of the CU, the video coder may normalize the motion vector difference based on the size of the CU. In some examples, normalization can simplify the prediction, as restriction per size may maximize the utilization of 4×4 subblocks in affine motion.

The following is an example of normalization, restriction for 6-parameter affine model and 4-parameter affine models (e.g., as used in VTM):

Normalization of the Motion Vector Difference:

An instance of the Norm of the motion vector differences based on the size (w×h) of the CU can be given as:

$$\mathrm{Norm}(v_{1x}-v_{0x})=(v_{1x}-v_{0x})*S/w$$

$$\mathrm{Norm}(v_{1y}-v_{0y})=(v_{1y}-v_{0y})*S/w$$

$$\mathrm{Norm}(v_{2x}-v_{0x})=(v_{2x}-v_{0x})*S/h$$

$$\mathrm{Norm}(v_{2y}-v_{0y})=(v_{2y}-v_{0y})*S/h \quad (19)$$

where S is the scaling factor to have a fixed-point implementation, and Norm(.) is on full pel scale. Other pixel resolutions can also be applied.

Restriction for the 6-Parameter Model:

The 4×4 affine mode is tested for the 6-parameter model if the following condition is satisfied:

$$|\mathrm{Norm}(v_{1x}-v_{0x})+\mathrm{Norm}(v_{2x}-v_{0x})+X|+|\mathrm{Norm}(v_{1y}-v_{0y})+\mathrm{Norm}(v_{2y}-v_{0y})+Y|+|\mathrm{Norm}(v_{1x}-v_{0x})-\mathrm{Norm}(v_{2x}-v_{0x})|+|\mathrm{Norm}(v_{1y}-v_{0y})-\mathrm{Norm}(v_{2y}-v_{0y})|<N \quad (20)$$

The bandwidth saving may be symmetric. However, the bandwidth saving should be shifted by the values of X and Y in (20). In also (20), N represents the bound of the restriction. This value can be adjusted to achieve a minimize bandwidth saving. For example, to ensure the bandwidth saving should not be smaller than 50%, X, Y and N are set S, S and S*7/2, respectively, if the operations are applied to full pel scale. For fractional pel scale, the values of X, Y, and N should be adjusted accordingly. N may also depend on the block size, the larger the block size, the larger N may be used (e.g., as larger block sizes have more 4×4 subblocks and therefore more overlapping area may be achieved).

Restriction for the 4-Parameter Model:

The 4-parameter affine model is a specific case of the 6-parameter models where only two control points are considered to get the motion vectors of the sub affine blocks. In this model, $(v_{2x}-v_{0x})$ and $(v_{2y}-v_{0y})$ are set as the follows:

$$(v_{2x}-v_{0x})=-(v_{1y}-v_{0y})$$

$$(v_{2y}-v_{0y})=(v_{1x}-v_{0x}) \quad (21)$$

In this case, the Norms of $(v_{2x}-v_{0x})$ and $(v_{2y}-v_{0y})$ are given as:

$$\text{Norm}(v_{2x}-v_{0x})=-\text{Norm}(v_{1y}-v_{0y})$$

$$\text{Norm}(v_{2y}-v_{0y})=\text{Norm}(v_{1x}-v_{0x}) \quad (22)$$

By applying (22) to (19), a restriction of the 4-parameter affine model can be given as:

$$|\text{Norm}(v_{1x}-v_{0x})-\text{Norm}(v_{1y}-v_{0y})+X|+|\text{Norm}(v_{1y}-v_{0y})+\text{Norm}(v_{1x}-v_{0x})+Y|+|\text{Norm}(v_{1x}-v_{0x})+\text{Norm}(v_{1y}-v_{0y})|+|\text{Norm}(v_{1y}-v_{0y})-\text{Norm}(v_{1x}-v_{0x})|<N \quad (23)$$

In some examples, the video coder may apply other restrictions (e.g., constraints) to the 4-parameter affine mode. As one example, the video coder may apply the following restriction:

$$|(v_{1x}-v_{0x})+w|+|(v_{1y}-v_{0y})|\leq(N+\log 2(h/8))(w/8) \quad (24)$$

where (+w) in the left-hand side of the condition indicates that the bandwidth reduction is symmetric but is shifted by a factor of w. The term log 2(h/8) is a bias normalized factor that represents the effect of h to the bandwidth saving. w/8 is a normalization of the block size. N represents the bandwidth saving level. The condition (24) can be confirmed by an example of bandwidth saving (%) calculated for blocks with w of 8 and various h.

An additional or alternative restriction for the 4-parameters affine model can be given as:

$$|\text{Norm}(v_{1x}-v_{0x})+X|+|\text{Norm}(v_{1y}-v_{0y})+Y|<N \quad (25)$$

where X, Y and N correspond to the bandwidth saving level.

An additional or alternative restriction for the 4-parameters affine model can be defined as:

$$c_1=|(v_{1x}-v_{0x})+4*\log 2(w/8)+2|+|(v_{1y}-v_{0y})+8*\log 2(w/8)+2*w/8|<N+4+w \quad (26)$$

$$c_2=|(v_{1x}-v_{0x})+w-4*\log 2(w/8)-2|+|(v_{1y}-v_{0y})-8*\log 2(w/8)-2*w/8|<N+4+w \quad (27)$$

If both of $c_1$ and $c_2$ are satisfied, the 4×4 affine mode may be tested. Otherwise (e.g., if one or both of $c_1$ and $c_2$ are not satisfied), the affine mode will be larger.

In yet another additional or alternative restriction method: the variable blkW specifies the width of the block, and the variable blkH specifies the height of the block. The variable subBlkW specifies the default width of the sub-block for affine motion compensation. The variable subBlkH specifies the default height of the sub-block for affine motion compensation. In this example, if the restriction conditions are satisfied, the sub-block for affine motion compensation has the size (subBlkW, subBlkH); otherwise, the sub-block for affine motion compensation has the size (subBlkW*2, subBlkH*2). Typically, subBlkW=4 and subBlkH=4, but they may have other integer values.

Some example restrictions for the 6-parameter affine model include:

In one example, $$-subBlkW \leq \frac{v_{1x}-v_{0x}}{blkW}*subBlkW < 1 \quad (28)$$

$$-1 < \frac{v_{1y}-v_{0y}}{blkW}*subBlkW < 1 \quad (29)$$

$$-1 < \frac{v_{2x}-v_{0x}}{blkH}*subBlkH < 1 \quad (30)$$

-continued $$-subBlkH \leq \frac{v_{2y}-v_{0y}}{blkH}*subBlkH < 1 \quad (31)$$

$$-blkW \leq \frac{v_{1x}-v_{0x}}{blkW}*subBlkW + \frac{v_{2x}-v_{0x}}{blkH}*subBlkH < 1 \quad (32)$$

$$-blkH \leq \frac{v_{1y}-v_{0y}}{blkW}*subBlkW + \frac{v_{2y}-v_{0y}}{blkH}*subBlkH < 1 \quad (33)$$

When normalization is applied, the restrictions become:

$$-subBlkW*S \leq \text{Norm}(v_{1x}-v_{0x})*subBlkW < S \quad (34)$$

$$-S < \text{Norm}(v_{1y}-v_{0y})*subBlkW < S \quad (35)$$

$$-S < \text{Norm}(v_{2x}-v_{0x})*subBlkH < S \quad (36)$$

$$-S \leq \text{Norm}(v_{2x}-v_{0x})*subBlkH < S \quad (37)$$

$$-blkW*S \leq \text{Norm}(v_{1x}-v_{0x})*subBlkW+\text{Norm}(v_{2x}-v_{0x})*subBlkH < S \quad (38)$$

$$-blkH*S \leq \text{Norm}(v_{1y}-v_{0y})*subBlkW+\text{Norm}(v_{2y}-v_{0y})*subBlkH < S \quad (39)$$

In another example, the "less than or equal to" operations "≤" may be replaced by a "less than" operation "<". For instance:

Equation (28) may be replaced by $$-subBlkW < \frac{v_{1x}-v_{0x}}{blkW}*subBlkW < 1 \quad (40)$$

Equations (31) to (33) are replaced by $$-subBlkH < \frac{v_{2y}-v_{0y}}{blkH}*subBlkH < 1 \quad (41)$$

$$-blkW < \frac{v_{1x}-v_{0x}}{blkW}*subBlkW + \frac{v_{2x}-v_{0x}}{blkH}*subBlkH < 1 \quad (42)$$

$$-blkH < \frac{v_{1y}-v_{0y}}{blkW}*subBlkW + \frac{v_{2y}-v_{0y}}{blkH}*subBlkH < 1 \quad (43)$$

The video coder may similarly apply the above-described normalization techniques. Where the motion vector resolution is in sub-pel and the $v_{ix}$, $v_{iy}$ are in unit of sub-pel, the video coder may scale the corresponding equations accordingly. For example, if normalization is applied, the video coder may scale S.

In the 4-parameter affine model, the video coder may set $(v_{2x}-v_{0x})$ and $(v_{2y}-v_{0y})$ as follows:

$$(v_{2x}-v_{0x})=-(v_{1y}-v_{0y})$$

$$(v_{2y}-v_{0y})=(v_{1x}-v_{0x})$$

In this case, the Norms of $(v_{2x}-v_{0x})$ and $(v_{2y}-v_{0y})$ are given as:

$$\text{Norm}(v_{2x}-v_{0x})=-\text{Norm}(v_{1y}-v_{0y})$$

$$\text{Norm}(v_{2y}-v_{0y})=\text{Norm}(v_{1x}-v_{0x})$$

Then the restriction of the 4-parameter affine model may be established accordingly.

An additional or alternative restriction for uni-directional prediction is described below. The restriction for uni-directional prediction can be the same as described above. The restriction can also be other alternative restriction.

In one example, the restrictions include Equations (28) and (29). If the restriction conditions are satisfied, the sub-block for affine motion compensation has the size (subBlkW, subBlkH). Otherwise, the sub-block for affine motion compensation has the size (subBlkW*2, subBlkH).

In still another example, the restrictions include Equations (40) and (29). If the restriction conditions are satisfied, the sub-block for affine motion compensation has the size (subBlkW, subBlkH). Otherwise, the sub-block for affine motion compensation has the size (subBlkW*2, subBlkH).

In still another example, the restrictions include Equations (30) and (31). If the restriction conditions are satisfied, the sub-block for affine motion compensation has the size (subBlkW, subBlkH). Otherwise, the sub-block for affine motion compensation has the size (subBlkW, subBlkH*2).

In still another example, the restrictions include Equations (30) and (41). If the restriction conditions are satisfied, the sub-block for affine motion compensation has the size (subBlkW, subBlkH). Otherwise, the sub-block for affine motion compensation has the size (subBlkW, subBlkH*2). Additionally, the normalization may be applied for the above described examples.

Video encoder 200 represents an example of a device configured to encode video data including a memory configured to store video data, and one or more processing units implemented in circuitry and configured to obtain values of CPMVs for a current block of video data; determine whether a memory bandwidth needed for accessing samples of a plurality of reference blocks derived based on the values of the CPMVs satisfies a bandwidth threshold; selectively modify, based on whether the determined memory bandwidth satisfies the bandwidth threshold, a motion compensation method used to predict samples of the current block of video data; and predict, using the selectively modified motion compensation method, the samples of the current block of video data from the samples of the plurality of reference blocks.

Figure 5:
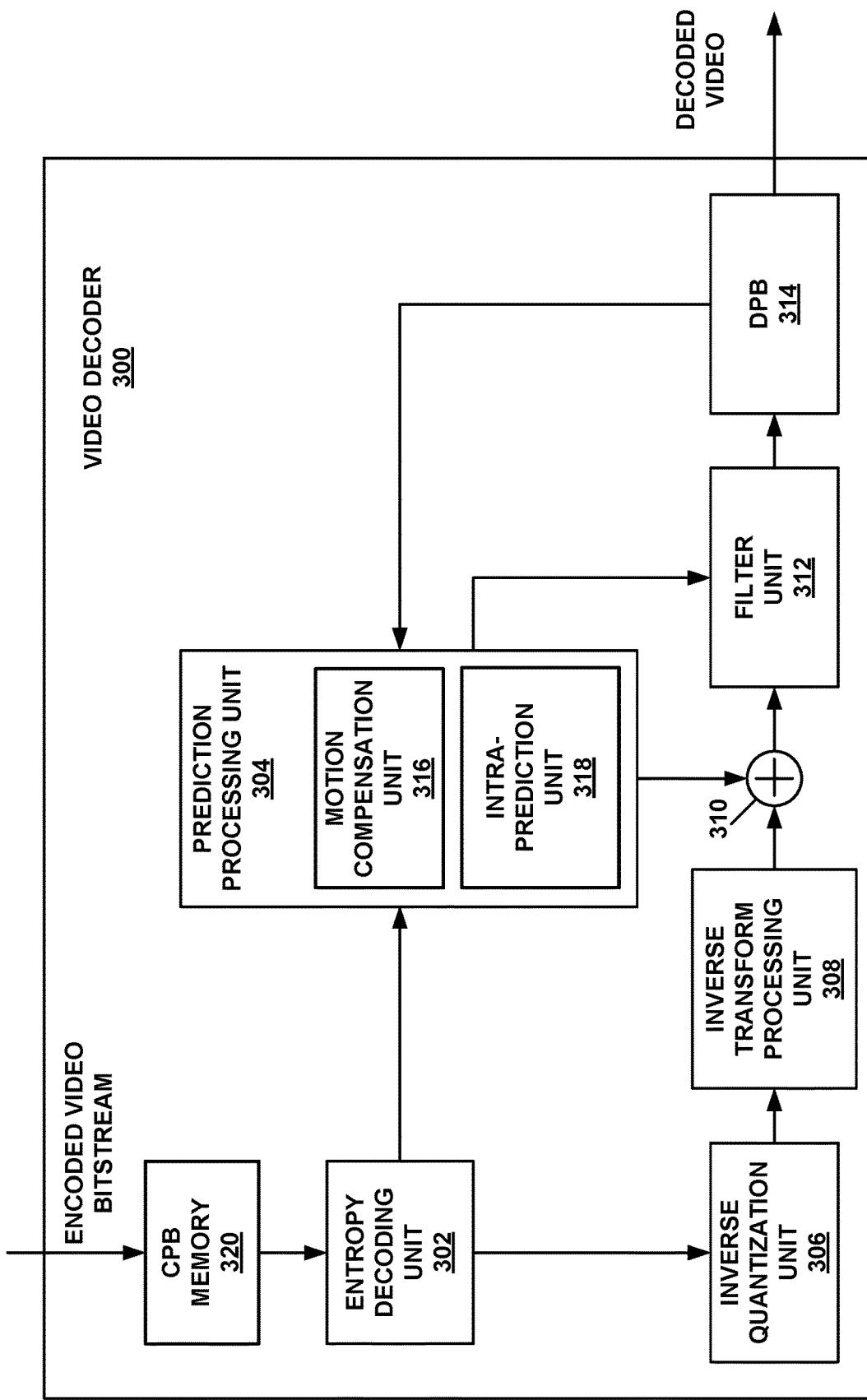
FIG. 5 is a block diagram illustrating an example video decoder that may perform the techniques of this disclosure.

FIG. 5 is a block diagram illustrating an example video decoder 300 that may perform the techniques of this disclosure. FIG. 5 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to operate according to other video coding standards.

In the example of FIG. 5, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 5 are illustrated to assist with understanding the operations performed by video decoder 300. The units may be implemented as fixed-function circuits, programmable circuits, or a combination thereof. Similar to FIG. 4, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 4).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 4). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processing units implemented in circuitry and configured to obtain values of CPMVs for a current block of video data; determine whether a memory bandwidth needed for accessing samples of a plurality of reference blocks derived based on the values of the CPMVs satisfies a bandwidth threshold; selectively modify, based on whether the determined memory bandwidth satisfies the bandwidth threshold, a motion compensation method used to predict samples of the current block of video data; and predict, using the selectively modified motion compensation method, the samples of the current block of video data from the samples of the plurality of reference blocks.

Figure 9:
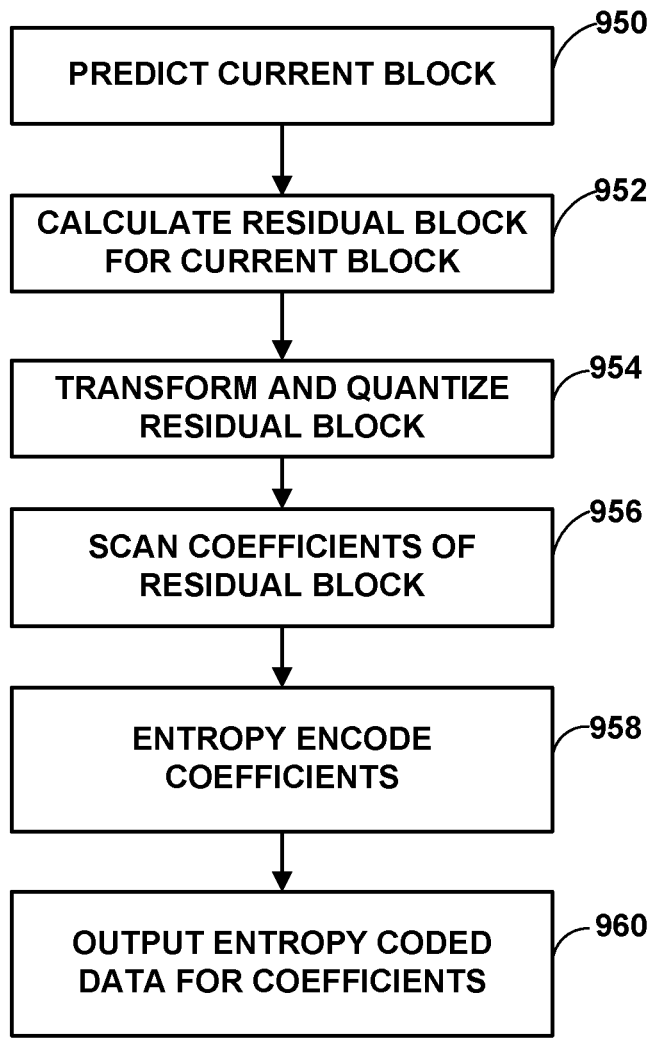
FIG. 9 is a flowchart illustrating an example method for encoding a current block.

FIG. 9 is a flowchart illustrating an example method for encoding a current block. The current block may comprise a current CU. Although described with respect to video encoder 200 (FIGS. 1 and 4), it should be understood that other devices may be configured to perform a method similar to that of FIG. 9.

In this example, video encoder 200 initially predicts the current block (950). For example, video encoder 200 may form a prediction block for the current block. As discussed above, in some examples, video encoder 200 may predict the current block using affine mode. In accordance with one or more techniques of this disclosure, video encoder 200 may perform various techniques to manage the memory bandwidth used to predict the current block of video data. One example of such a memory bandwidth management technique is discussed below with reference to FIG. 11.

Video encoder 200 may then calculate a residual block for the current block (952). To calculate the residual block, video encoder 200 may calculate a difference between the original, unencoded block and the prediction block for the current block. Video encoder 200 may then transform and quantize coefficients of the residual block (954). Next, video encoder 200 may scan the quantized transform coefficients of the residual block (956). During the scan, or following the scan, video encoder 200 may entropy encode the coefficients (958). For example, video encoder 200 may encode the coefficients using CAVLC or CABAC. Video encoder 200 may then output the entropy encoded data of the block (960).

Figure 10:
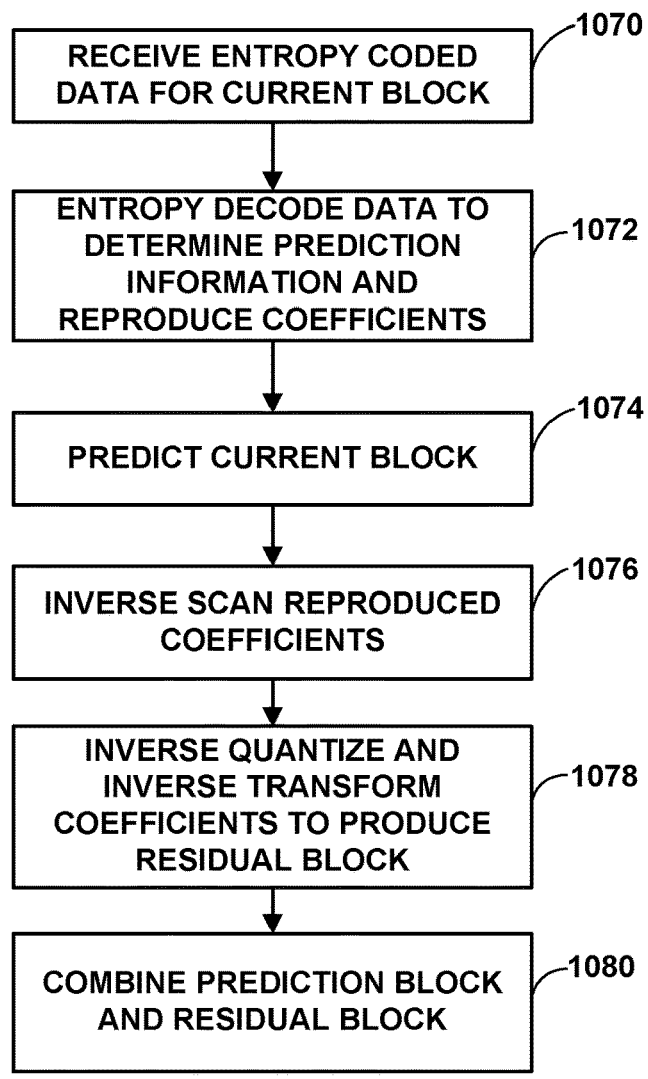
FIG. 10 is a flowchart illustrating an example method for decoding a current block.

FIG. 10 is a flowchart illustrating an example method for decoding a current block of video data. The current block may comprise a current CU. Although described with respect to video decoder 300 (FIGS. 1 and 5), it should be understood that other devices may be configured to perform a method similar to that of FIG. 10.

Video decoder 300 may receive entropy encoded data for the current block, such as entropy encoded prediction information and entropy encoded data for coefficients of a residual block corresponding to the current block (1070). Video decoder 300 may entropy decode the entropy encoded data to determine prediction information for the current block and to reproduce coefficients of the residual block (1072). Video decoder 300 may predict the current block (1074), e.g., using an intra- or inter-prediction mode as indicated by the prediction information for the current block, to calculate a prediction block for the current block. As discussed above, in some examples, video decoder 300 may predict the current block using affine mode. In accordance with one or more techniques of this disclosure, video decoder 300 may perform various techniques to manage the memory bandwidth used to predict the current block of video data. One example of such a memory bandwidth management technique is discussed below with reference to FIG. 11.

Video decoder 300 may then inverse scan the reproduced coefficients (1076), to create a block of quantized transform coefficients. Video decoder 300 may then inverse quantize and inverse transform the coefficients to produce a residual block (1078). Video decoder 300 may ultimately decode the current block by combining the prediction block and the residual block (1080).

Figure 11:
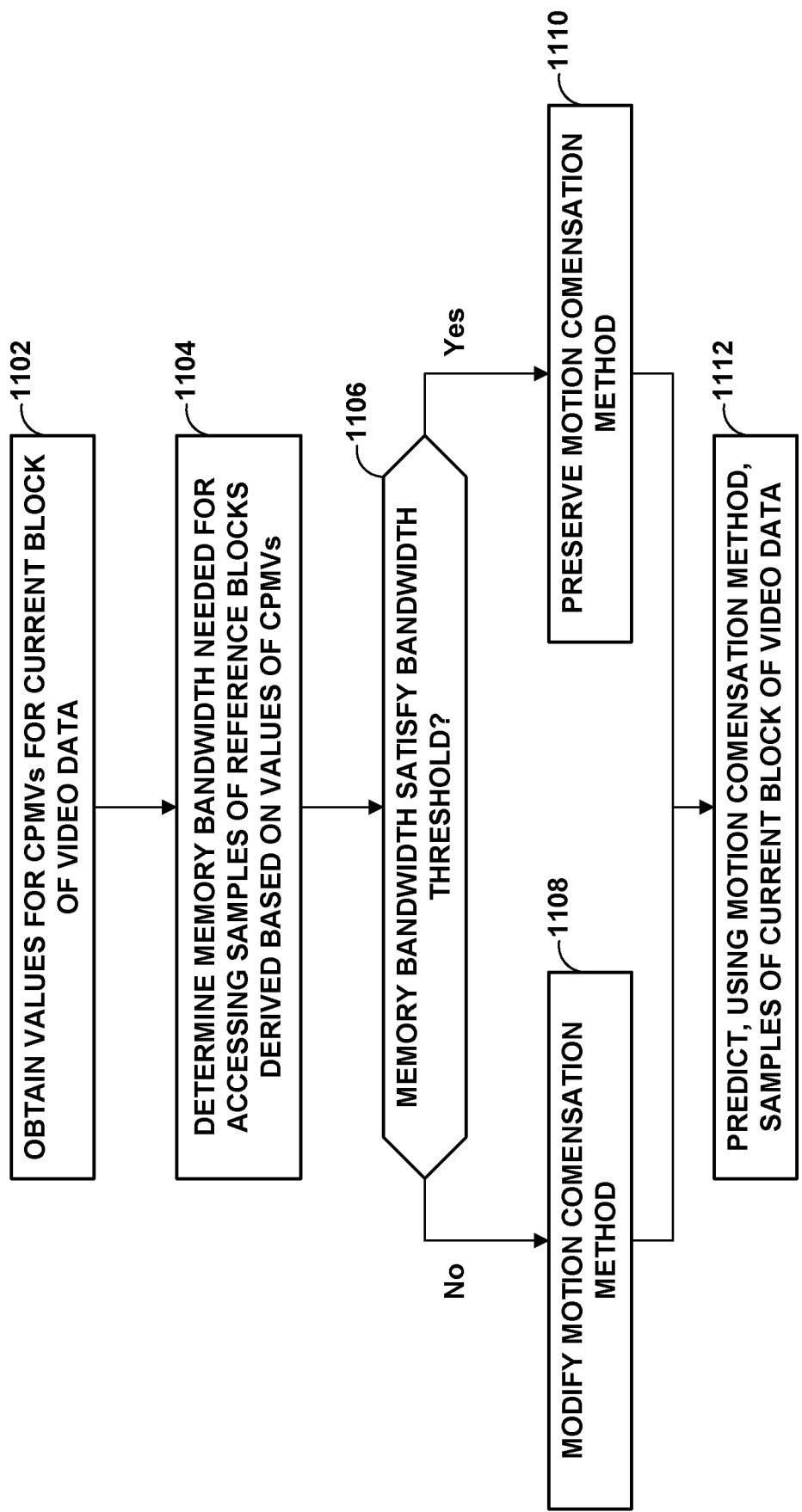
FIG. 11 is a flowchart illustrating an example method for managing the memory bandwidth used for predicting video data, in accordance with one or more techniques of this disclosure.

FIG. 11 is a flowchart illustrating an example method for managing the memory bandwidth used for predicting video data, in accordance with one or more techniques of this disclosure. The techniques of FIG. 11 may be performed by a video coder, such as video encoder 200 of FIGS. 1 and 4 and/or video decoder 300 of FIGS. 1 and 5. For simplicity of explanation, the techniques of FIG. 11 are described as being performed by video decoder 300 of FIGS. 1 and 5.

Video decoder 300 may obtain values of control point motion vectors (CPMVs) for a current block of video data (1102). For instance, video decoder 300 may obtain values of $\vec{v}_0$, $\vec{v}_1$, and $\vec{v}_2$ of block 600 of FIG. 6. Video decoder 300 may obtain the values of the CPMVs based on values of motion vectors (which may or may not be CPMVs) of spatial neighboring blocks of the current block.

Video decoder 300 may determine a memory bandwidth needed for accessing samples of reference blocks derived based on the values of the CPMVs (1104). For instance, where the current block is block 806 of FIG. 8, video decoder 300 may determine the memory bandwidth needed for accessing samples of reference regions 810 (which include the reference blocks and additional samples used for interpolation). As discussed above, reference regions 810 are identified by sub-block motion vectors $mv_A$–$mv_D$, which are derived from CPMVs of block 806.

Video decoder 300 may determine whether the determined memory bandwidth satisfies a bandwidth threshold (1106). As discussed above, the bandwidth threshold may be a predetermined bandwidth threshold. In some examples, video decoder 300 may determine that the memory bandwidth satisfies the bandwidth threshold where the determined memory bandwidth is less than or equal to (e.g., < or =) the bandwidth threshold. In some examples, video decoder 300 may determine that the memory bandwidth satisfies the bandwidth threshold where the determined memory bandwidth is less than (e.g., <) the bandwidth threshold. In some examples, video decoder 300 may determine that the memory bandwidth does not satisfy the bandwidth threshold where the determined memory bandwidth is greater than (e.g., >) the bandwidth threshold. In some examples, video decoder 300 may determine that the memory bandwidth does not satisfy the bandwidth threshold where the determined memory bandwidth is greater than or equal to (e.g., > or =) the bandwidth threshold.

Video decoder 300 may selectively modify a motion compensation method used to predict samples of the current block of video data based on whether the determined memory bandwidth satisfies the bandwidth threshold. As one example, video decoder 300 may modify the motion compensation method in response to determining that the memory bandwidth does not satisfy the bandwidth threshold ("No" branch of 1106, 1108). As another example, video decoder 300 may preserve (e.g., not modify) the motion compensation method in response to determining that the memory bandwidth does satisfy the bandwidth threshold ("Yes" branch of 1106, 1110). Where video decoder 300 determines to modify the motion compensation method, video decoder 300 may modify the motion compensation method in any number of ways. In general, by modifying the motion compensation method, video decoder 300 will reduce the memory bandwidth needed to predict the samples of the current block (i.e., the memory bandwidth needed to access samples of predictor blocks of the current block).

Video decoder 300 may predict, using the selectively modified motion compensation method, the samples of the current block of video data (1112). For instance, prediction processing unit 304 of video decoder 300 may access, from memory (e.g., decoded picture buffer 314 of video decoder 300), samples of a plurality of reference blocks derived based on the values of the CPMVs. Video decoder 300 may determine values of the samples of the current block based on the samples of the reference blocks and residual data.

As discussed above, in some examples, video decoder 300 may apply the bandwidth reduction techniques separately to each prediction direction (e.g., to either L0 or L1 motion separately). For instance, when the current block is bi-directionally predicted, video decoder 300 may obtain values of CPMVs for the current block for a first prediction direction (e.g., L0), and obtain values of CPMVs for the current block for a second prediction direction (e.g., L1). Video decoder 300 may independently test the bandwidth requirements for each prediction direction. For instance, video decoder 300 may determine whether a memory bandwidth needed for accessing samples of a plurality of reference blocks derived based on the values of the CPMVs for the first prediction direction satisfies the bandwidth threshold; and determine whether a memory bandwidth needed for accessing samples of a plurality of reference blocks derived based on the values of the CPMVs for the second prediction direction satisfies the bandwidth threshold. Based on the testing, video decoder 300 may independently selectively modify the motion compensation methods used for each prediction direction. For instance, video decoder 300 may selectively modify, based on whether the determined memory bandwidth for the first prediction direction satisfies the bandwidth threshold, a motion compensation method used to predict samples of the current block of video data in the first prediction direction; and selectively modify, based on whether the determined memory bandwidth for the second prediction direction satisfies the bandwidth threshold, a motion compensation method used to predict samples of the current block of video data in the second prediction direction. As a result, video decoder 300 may modify the motion compensation methods used for both prediction directions separately and independently (e.g., change one but not the other, change both, change neither).

In some examples, video decoder 300 independently selectively adjust the motion compensation methods used to predict each respective block based on the memory bandwidth requirements of the respective block. For instance, where a coding unit (CU) includes a plurality of 8×8 sub-blocks, video decoder 300 may separately determine, for each respective sub-block of the plurality of sub-blocks, whether a respective memory bandwidth needed for accessing samples of a respective plurality of reference blocks for the respective sub-block satisfies the bandwidth threshold. Video decoder 300 may selectively modify, based on whether the respective memory bandwidth for the particular sub-block satisfies the bandwidth threshold, a motion compensation method used to predict samples of the respective sub-block. In other words, video decoder 300 may selectively adjust the motion compensation method for each sub-block independently of the other sub-blocks. As such, depending on the memory bandwidth requirements of each sub-block, video decoder 300 may adjust the motion compensation method used for some sub-blocks of the CU while not adjusting the motion compensation method used for other sub-blocks of the same CU.

However, in some examples, it may not be desirable for video decoder 300 to independently selectively adjust the motion compensation methods used to predict each respective block based on the memory bandwidth requirements of the respective block. For instance, evaluating and testing the memory bandwidth of each sub-block may be computationally intensive, which may slow down the decoding process.

In accordance with one or more techniques of this disclosure, video decoder 300 may selectively adjust the motion compensation method used to predict a plurality of sub-blocks based on the memory bandwidth requirements of a particular sub-block of the plurality of sub-blocks. For instance, where a CU includes a plurality of 8×8 sub-blocks, video decoder 300 may determine, for a particular sub-block of the plurality of sub-blocks, whether a respective memory bandwidth needed for predicting the particular sub-block satisfies the bandwidth threshold. Based on whether the memory bandwidth for the particular sub-block satisfies the bandwidth threshold, video decoder 300 may modify the motion compensation methods used to predict samples of all of the plurality of sub-block. In other words, video decoder 300 may selectively adjust the motion compensation method for each sub-block based on an evaluation of a single sub-block. In this way, video decoder 300 may avoid having to separately determine the memory bandwidth requirements of each sub-block.

Figure 12:
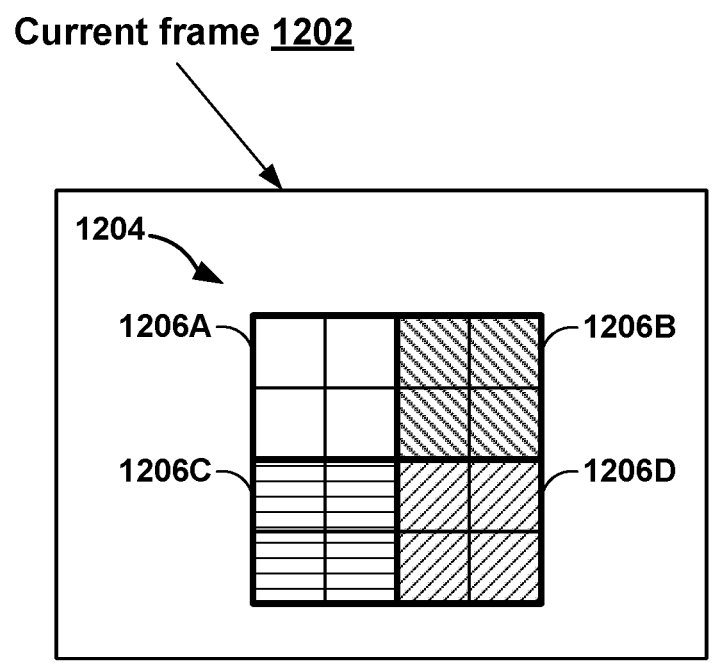
FIG. 12 is a conceptual diagram illustrating simplified memory bandwidth testing, in accordance with one or more aspects of this disclosure.

FIG. 12 is a conceptual diagram illustrating simplified memory bandwidth testing, in accordance with one or more aspects of this disclosure. As shown in FIG. 12, coding unit (CU) 1204 includes four sub-blocks 1206A-1206D (collectively, "sub-blocks 1206"). For instance, CU 1204 may be a 16×16 CU and each of sub-blocks 1206 may be an 8×8 coding block. As shown in FIG. 12, each of sub-blocks 1206 may include sub-blocks of their own. For instance, sub-block 1206 may be divided into four sub-blocks, which may be similar to sub-blocks 808 of FIG. 8.

As discussed above, a video coder (e.g., video encoder 200 and/or video decoder 300) may selectively adjust the motion compensation of sub-blocks of a CU independently or dependently. To independently selectively adjust the motion compensation, the video coder may separately determine a memory bandwidth requirement of each of sub-blocks 1206. For instance, the video coder may determine a first memory bandwidth for sub-block 1206A, a second memory bandwidth for sub-block 1206B, a third memory bandwidth for sub-block 1206C, and a fourth memory bandwidth for sub-block 1206D. The video coder may separately determine whether to adjust the motion compensation methods used for each respective sub-block of sub-blocks 1206 based on the memory bandwidth of the respective sub-block. For instance, the video coder may determine whether to adjust the motion compensation method used for sub-block 1206A based on the first memory bandwidth, determine whether to adjust the motion compensation method used for sub-block 1206B based on the second memory bandwidth, determine whether to adjust the motion compensation method used for sub-block 1206C based on the third memory bandwidth, and determine whether to adjust the motion compensation method used for sub-block 1206D based on the fourth memory bandwidth.

To dependently adjust the motion compensation, the video coder may determine a memory bandwidth requirement of a single sub-block of sub-blocks 1206 and selectively adjust the motion compensation method used for all of sub-blocks 1206 based on the memory bandwidth requirement of the single sub-block. For instance, the video coder may determine the memory bandwidth of sub-block 1206A and selectively adjust the motion compensation method used for all of sub-blocks 1206 based on the memory bandwidth requirement of sub-block 1206A. In some examples, the video coder may select which sub-block to test based on position. For instance, the video coder may select the top-left sub-block to test (e.g., sub-block 1206A in FIG. 12). In this way, the video coder may avoid having to determine the memory bandwidth requirements of sub-blocks 1206B, 1206C, and 1206D.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
    obtaining, by a video decoder, values of control point motion vectors (CPMVs) for a current block of video data selected for coding using affine mode, each respective CPMV of the CPMVs identifying a respective reference block of a plurality of reference blocks;
    determining, by the video decoder, a memory bandwidth needed for accessing samples of a plurality of reference blocks, the memory bandwidth needed for accessing the samples of the plurality of reference blocks being derived based on differences between the values of the CPMVs, wherein the differences between the values of the CPMVs indicate distances between reference blocks of the plurality of reference blocks;
    determining, by the video decoder, whether the determined memory bandwidth satisfies a bandwidth threshold;
    selectively modifying, by the video decoder and based on whether the determined memory bandwidth satisfies the bandwidth threshold, a motion compensation method used to predict samples of the current block of video data; and
    predicting, by the video decoder and using the selectively modified motion compensation method, the samples of the current block of video data from the samples of the plurality of reference blocks.

2. The method of claim 1, wherein selectively modifying the motion compensation method comprises not modifying the motion compensation method in response to determining that the memory bandwidth satisfies the bandwidth threshold.

3. The method of claim 2, wherein selectively modifying the motion compensation method comprises modifying the motion compensation method in response to determining that the memory bandwidth does not satisfy the bandwidth threshold.

4. The method of claim 3, further comprising:
    determining that the memory bandwidth satisfies the bandwidth threshold in response to determining that the memory bandwidth is less than or equal to the bandwidth threshold.

5. The method of claim 1, wherein determining whether the memory bandwidth needed for accessing the samples of the reference blocks satisfies the bandwidth threshold comprises:
    determining, based on differences between the values of the CPMVs, whether the memory bandwidth needed for accessing the samples of the reference blocks satisfies the bandwidth threshold.

6. The method of claim 1, wherein:
    the current block of video data is a current coding unit (CU) of video data that includes a plurality of sub-blocks of video data;
    determining whether the memory bandwidth needed for accessing samples of the plurality of reference blocks satisfies the bandwidth threshold comprises determining whether a memory bandwidth needed for accessing samples of a plurality of reference blocks for a particular sub-block of the plurality of sub-blocks satisfies the bandwidth threshold;
    the motion compensation method used to predict the samples of the current block of video data is a motion compensation method used to predict samples of the particular sub-block; and
    selectively modifying the motion compensation method comprises selectively modifying, based on whether the memory bandwidth needed for accessing samples of the plurality of reference blocks for the particular sub-block satisfies the bandwidth threshold, the motion compensation method used to predict samples of the particular sub-block.

7. The method of claim 6, further comprising:
    responsive to modifying the motion compensation method used to predict samples of the particular sub-block, determining to modify motion compensation methods used to predict samples of other sub-blocks of the plurality of sub-blocks.

8. The method of claim 7, wherein determining to modify the motion compensation methods used to predict samples of the other sub-blocks of the plurality of sub-blocks comprises determining to modify the motion compensation methods used to predict samples of the other sub-blocks of the plurality of sub-blocks without determining whether respective memory bandwidths needed for accessing samples of the other sub-blocks satisfy the bandwidth threshold.

9. The method of claim 6, wherein the particular sub-block is a top-left sub-block.

10. The method of claim 1, wherein:
    the current block of video data is a current coding unit (CU) of video data that includes a plurality of sub-blocks of video data;
    determining whether the memory bandwidth satisfies the bandwidth threshold comprises determining, for each respective sub-block of the plurality of sub-blocks, whether a respective memory bandwidth needed for accessing samples of a respective plurality of reference blocks for the respective sub-block satisfies the bandwidth threshold;

the motion compensation method used to predict the samples of the current block of video data is a motion compensation method used to predict samples of the respective sub-block; and selectively modifying the motion compensation method comprises selectively modifying, based on whether the respective memory bandwidth for the particular sub-block satisfies the bandwidth threshold, the motion compensation method used to predict samples of the respective sub-block.

11. The method of claim 1, wherein selectively modifying the motion compensation method used to predict samples of the current block of video data comprises reducing the memory bandwidth needed to predict the samples of the current block.

12. The method of claim 1, wherein:
obtaining the values of the CPMVs for the current block comprises:
obtaining values of CPMVs for a first prediction direction; and
obtaining values of CPMVs for a second prediction direction;
determining whether the memory bandwidth needed for accessing samples of the plurality of reference blocks derived based on the values of the CPMVs satisfies the bandwidth threshold comprises:
determining whether a first memory bandwidth needed for accessing samples of a plurality of reference blocks derived based on the values of the CPMVs for the first prediction direction satisfies the bandwidth threshold; and
determining whether a second memory bandwidth needed for accessing samples of a plurality of reference blocks derived based on the values of the CPMVs for the second prediction direction satisfies the bandwidth threshold;
selectively modifying the motion compensation method comprises:
selectively modifying, based on whether the first memory bandwidth for the first prediction direction satisfies the bandwidth threshold, a motion compensation method used to predict samples of the current block of video data in the first prediction direction; and
selectively modifying, based on whether the second memory bandwidth for the second prediction direction satisfies the bandwidth threshold, a motion compensation method used to predict samples of the current block of video data in the second prediction direction.

13. A device for decoding video data; the device comprising:
a memory configured to store the video data; and
one or more processors implemented in circuitry and configured to:
obtain values of control point motion vectors (CPMVs) for a current block of video data selected for coding using affine mode, each respective CPMV of the CPMVs identifying a respective reference block of a plurality of reference blocks;
determine a memory bandwidth needed for accessing samples of a plurality of reference blocks, the memory bandwidth needed for accessing the samples of the plurality of reference blocks being derived based on differences between values of the CPMVs, wherein the differences between the values of the CPMVs indicate distances between reference blocks of the plurality of reference blocks;
determine whether the determined memory bandwidth satisfies a bandwidth threshold;
selectively modify, based on whether the determined memory bandwidth satisfies the bandwidth threshold, a motion compensation method used to predict samples of the current block of video data; and
predict, using the selectively modified motion compensation method, the samples of the current block of video data from the samples of the plurality of reference blocks.

14. The device of claim 13, wherein, to selectively modify the motion compensation method, the one or more processors are configured to not modify the motion compensation method in response to determining that the memory bandwidth satisfies the bandwidth threshold.

15. The device of claim 14, wherein, to selectively modify the motion compensation method, the one or more processors are configured to modify the motion compensation method in response to determining that the memory bandwidth does not satisfy the bandwidth threshold.

16. The device of claim 15, wherein the one or more processors are configured to determine that the memory bandwidth satisfies the bandwidth threshold in response to determining that the memory bandwidth is less than or equal to the bandwidth threshold.

17. The device of claim 13, wherein, to determine whether the memory bandwidth needed for accessing the samples of the reference blocks satisfies the bandwidth threshold, the one or more processors are configured to:
determine, based on differences between the values of the CPMVs, whether the memory bandwidth needed for accessing the samples of the reference blocks satisfies the bandwidth threshold.

18. The device of claim 13, wherein:
the current block of video data is a current coding unit (CU) of video data that includes a plurality of sub-blocks of video data;
to determine whether the memory bandwidth needed for accessing samples of the plurality of reference blocks satisfies the bandwidth threshold, the one or more processors are configured to determine whether a memory bandwidth needed for accessing samples of a plurality of reference blocks for a particular sub-block of the plurality of sub-blocks satisfies the bandwidth threshold;
the motion compensation method used to predict the samples of the current block of video data is a motion compensation method used to predict samples of the particular sub-block; and
to selectively modify the motion compensation method, the one or more processors are configured to selectively modify, based on whether the memory bandwidth needed for accessing samples of the plurality of reference blocks for the particular sub-block satisfies the bandwidth threshold, the motion compensation method used to predict samples of the particular sub-block.

19. The device of claim 18, wherein the one or more processors are further configured to:
determine, responsive to modifying the motion compensation method used to predict samples of the particular sub-block, to modify motion compensation methods used to predict samples of other sub-blocks of the plurality of sub-blocks.

20. The device of claim 19, wherein, to determine to modify the motion compensation methods used to predict samples of the other sub-blocks of the plurality of sub-blocks, the one or more processors are configured to determine to modify the motion compensation methods used to predict samples of the other sub-blocks of the plurality of sub-blocks without determining whether respective memory bandwidths needed for accessing samples of the other sub-blocks satisfy the bandwidth threshold.

21. The device of claim 18, wherein the particular sub-block is a top-left sub-block.

22. The device of claim 13, wherein:
the current block of video data is a current coding unit (CU) of video data that includes a plurality of sub-blocks of video data;
to determine whether the memory bandwidth needed for accessing samples of the plurality of reference blocks satisfies the bandwidth threshold, the one or more processors are configured to determine, for each respective sub-block of the plurality of sub-blocks, whether a respective memory bandwidth needed for accessing samples of a respective plurality of reference blocks for the respective sub-block satisfies the bandwidth threshold; and
to selectively modify the motion compensation method, the one or more processors are configured to selectively modify, based on whether the respective memory bandwidth for the particular sub-block satisfies the bandwidth threshold, a motion compensation method used to predict samples of the respective sub-block.

23. The device of claim 13, wherein, to selectively modify the motion compensation method used to predict samples of the current block of video data, the one or more processors are configured to reduce the memory bandwidth needed to predict the samples of the current block.

24. The device of claim 13, wherein:
to obtain the values of the CPMVs for the current block, the one or more processors are configured to:
obtain values of CPMVs for a first prediction direction; and
obtain values of CPMVs for a second prediction direction;
to determine whether the memory bandwidth needed for accessing samples of the plurality of reference blocks derived based on the values of the CPMVs satisfies the bandwidth threshold, the one or more processors are configured to:
determine whether a first memory bandwidth needed for accessing samples of a plurality of reference blocks derived based on the values of the CPMVs for the first prediction direction satisfies the bandwidth threshold; and
determine whether a second memory bandwidth needed for accessing samples of a plurality of reference blocks derived based on the values of the CPMVs for the second prediction direction satisfies the bandwidth threshold;
to selectively modify the motion compensation method, the one or more processors are configured to:
selectively modify, based on whether the first memory bandwidth for the first prediction direction satisfies the bandwidth threshold, a motion compensation method used to predict samples of the current block of video data in the first prediction direction; and
selectively modify, based on whether the second memory bandwidth for the second prediction direction satisfies the bandwidth threshold, a motion compensation method used to predict samples of the current block of video data in the second prediction direction.

25. A non-transitory computer-readable storage medium having stored thereon instructions that, when executed, cause one or more processors of a video decoder to:
obtain values of control point motion vectors (CPMVs) for a current block of video data selected for coding using affine mode, each respective CPMV of the CPMVs identifying a respective reference block of a plurality of reference blocks;
determine a memory bandwidth needed for accessing samples of a plurality of reference blocks, the memory bandwidth needed for accessing the samples of the plurality of reference blocks being derived based on differences between the values of the CPMVs, wherein the differences between the values of the CPMVs indicate distances between reference blocks of the plurality of reference blocks;
determine whether the determined memory bandwidth satisfies a bandwidth threshold;
selectively modify, based on whether the determined memory bandwidth satisfies the bandwidth threshold, a motion compensation method used to predict samples of the current block of video data; and
predict, using the selectively modified motion compensation method, the samples of the current block of video data from the samples of the plurality of reference blocks.

26. A device for decoding video data, the device comprising:
means for obtaining values of control point motion vectors (CPMVs) for a current block of video data selected for coding using affine mode, each respective CPMV of the CPMVs identifying a respective reference block of a plurality of reference blocks;
means for determining a memory bandwidth needed for accessing samples of a plurality of reference blocks, the memory bandwidth needed for accessing the samples of the plurality of reference blocks being derived based on differences between the values of the CPMVs, wherein the differences between the values of the CPMVs indicate distances between reference blocks of the plurality of reference blocks;
means for determining whether the determined memory bandwidth satisfies a bandwidth threshold;
means for selectively modifying, based on whether the determined memory bandwidth satisfies the bandwidth threshold, a motion compensation method used to predict samples of the current block of video data; and
means for predicting, using the selectively modified motion compensation method, the samples of the current block of video data from the samples of the plurality of reference blocks.

* * * * *